United States Patent
Rodriguez et al.

(10) Patent No.: US 11,349,434 B2
(45) Date of Patent: May 31, 2022

(54) REMOTE ARRAY MAPPING

(71) Applicant: SunPower Corporation, San Jose, CA (US)

(72) Inventors: Fernando Rodriguez, Austin, TX (US); Patrick L. Chapman, Austin, TX (US); Jonathan Ehlmann, Austin, TX (US)

(73) Assignee: SunPower Corporation, San Jose (GA)

( * ) Notice: Subject to any disclaimer, the term of this patent is extended or adjusted under 35 U.S.C. 154(b) by 0 days.

(21) Appl. No.: 17/130,454

(22) Filed: Dec. 22, 2020

(65) Prior Publication Data

US 2021/0111672 A1    Apr. 15, 2021

Related U.S. Application Data

(63) Continuation of application No. 16/275,981, filed on Feb. 14, 2019, now Pat. No. 10,892,708.

(60) Provisional application No. 62/634,254, filed on Feb. 23, 2018.

(51) Int. Cl.
*H02S 50/10* (2014.01)
*H02S 40/32* (2014.01)

(52) U.S. Cl.
CPC .............. *H02S 50/10* (2014.12); *H02S 40/32* (2014.12)

(58) Field of Classification Search
CPC ........... H02S 50/10; H02S 40/32; Y02E 10/05
See application file for complete search history.

(56) References Cited

U.S. PATENT DOCUMENTS

| | | | |
|---|---|---|---|
| 4,977,370 A | 12/1990 | Andrews | |
| 6,064,214 A | 5/2000 | Self | |
| 6,784,675 B2 | 8/2004 | Willard | |
| 2009/0234692 A1 | 1/2009 | Powell | |
| 2009/0304227 A1 | 12/2009 | Kennedy | |
| 2012/0158362 A1* | 6/2012 | Vandevelde | H01L 31/02021 702/183 |
| 2012/0206118 A1 | 8/2012 | Williams | |
| 2012/0300347 A1 | 11/2012 | Fahrenbruch | |
| 2013/0346054 A1 | 12/2013 | Mumtaz | |
| 2014/0003110 A1 | 1/2014 | Rothblum et al. | |
| 2014/0055900 A1 | 2/2014 | Luebke | |
| 2014/0368058 A1 | 12/2014 | Orr et al. | |
| 2015/0340868 A1 | 11/2015 | Chapman | |
| 2016/0043684 A1 | 2/2016 | Harif | |
| 2018/0109224 A1* | 4/2018 | Chapman | H02S 50/10 |
| 2019/0267939 A1* | 8/2019 | Rodriguez | H02S 40/32 |

FOREIGN PATENT DOCUMENTS

JP    2014-161203 A    9/2014

OTHER PUBLICATIONS

International Search Report and Written Opinion, PCT Application PCT/US2017/056463, dated Jan. 31, 2018.

* cited by examiner

*Primary Examiner* — Giovanni Astacio-Oquendo
(74) *Attorney, Agent, or Firm* — Grasso PLLC

(57) ABSTRACT

Electrical component location is provided. Employed location techniques may include providing a signal, having components to be located sense the signal and report back the sensed signal, and determining relative locations for one or more of the components using the sensed signals reported by the components.

20 Claims, 20 Drawing Sheets

| Frequency(kHz) | MI 1(V) | MI 2(V) | MI 3(V) | ... | MI 24(V) |
|---|---|---|---|---|---|
| F1 | | | | ... | |
| F2 | | | | ... | |
| ... | ... | ... | ... | | ... |
| Fn | | | | ... | |

| Branch 1 MI's | Combinations | Lowest Score | Index | Cluster (MI #) |
|---|---|---|---|---|
| 0 | 1 | | | |
| 1 | 23 | 33.078 | 8 | 10 |
| 2 | 253 | 34.18 | 65 | 5,8 |
| 3 | 1771 | 35.914 | 1507 | 12,15,17 |
| 4 | 8855 | 36.647 | 8253 | 12,15,17,23 |
| 5 | 33649 | 36.947 | 29942 | 9,12,13,15,17 |
| 6 | 100947 | 36.735 | 94713 | 9,12,13,15,17,23 |
| 7 | 245157 | 36.173 | 237131 | 9,12,13,15,16,17,23 |
| 8 | 490314 | 36.734 | 482391 | 9,12,13,15,16,17,22,23 |
| 9 | 817190 | 36.401 | 811172 | 9,12,13,15,16,17,19,22,23 |
| 10 | 1144066 | 34.443 | 793479 | 4,5,6,7,8,10,14,18,20,24 |
| 11 | 1352078 | 28.406 | 1004092 | 4,5,6,7,8,10,14,18,20,21,24 |
| 12 | 1352078 | 28.406 | 347985 | 2,3,9,11,12,13,15,16,17,19,22,23 |

| Branch 1 MI's | Combinations | Lowest Score | Index | Cluster (MI #) |
|---|---|---|---|---|
| 0 | 1 | | | |
| 1 | 23 | 21.42 | 19 | 21 |
| 2 | 253 | 25.331 | 177 | 12,15 |
| 3 | 1771 | 26.27 | 1528 | 12,17,23 |
| 4 | 8855 | 26.511 | 8253 | 12,15,17,23 |
| 5 | 33649 | 27.197 | 32420 | 12,13,15,17,23 |
| 6 | 100947 | 27.2 | 94713 | 9,12,13,15,17,23 |
| 7 | 245157 | 27.162 | 237131 | 9,12,13,15,16,17,23 |
| 8 | 490314 | 28.88 | 482382 | 9,12,13,15,16,17,19,23 |
| 9 | 817190 | 29.431 | 811172 | 9,12,13,15,16,17,19,22,23 |
| 10 | 1144066 | 29.562 | 491402 | 2,9,12,13,15,16,17,19,22,23 |
| 11 | 1352078 | 29.801 | | 4,5,6,7,8,10,14,18,20,21,24 |
| 12 | 1352078 | 29.801 | 347985 | 2,3,9,11,12,13,15,16,17,19,22,23 |

FIG. 20

REMOTE ARRAY MAPPING

RELATED APPLICATIONS

This application is a continuation of U.S. patent application Ser. No. 16/275,981, which was filed on Feb. 14, 2019 and is entitled "Remote Array Wrapping." The '981 application claims priority to U.S. Provisional application 62/634,254, which was filed on Feb. 23, 2018 and is entitled "Remote Array Mapping." The '254 application is incorporated by reference in its entirety into this application.

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

PV modules are installed in a layout at an installation site. The installation process involves an installer placing rows of PV modules and connecting these rows of PV modules together into one or more groupings of the installation layout. The PV modules may be connected in groupings of various numbers and have several groupings at an installation site. The groupings may be uniform, for example six PV modules in each grouping, and nonuniform, for example, four PV modules in two groups and six PV modules in one group. Cabling and connections are also installed by an installer to connect and support the PV modules of a grouping and for the PV system installation as a whole. Once finished, the cabling and connections for the groupings of the PV modules, and of the PV system installation, remain in place, to permit the PV modules, and the whole installation, to transmit the electrical power the system is generating.

BRIEF DESCRIPTION OF THE DRAWINGS

FIG. 20 shows three tables of data that may be gathered during processes according to some embodiments.

DETAILED DESCRIPTION

Figure 1:
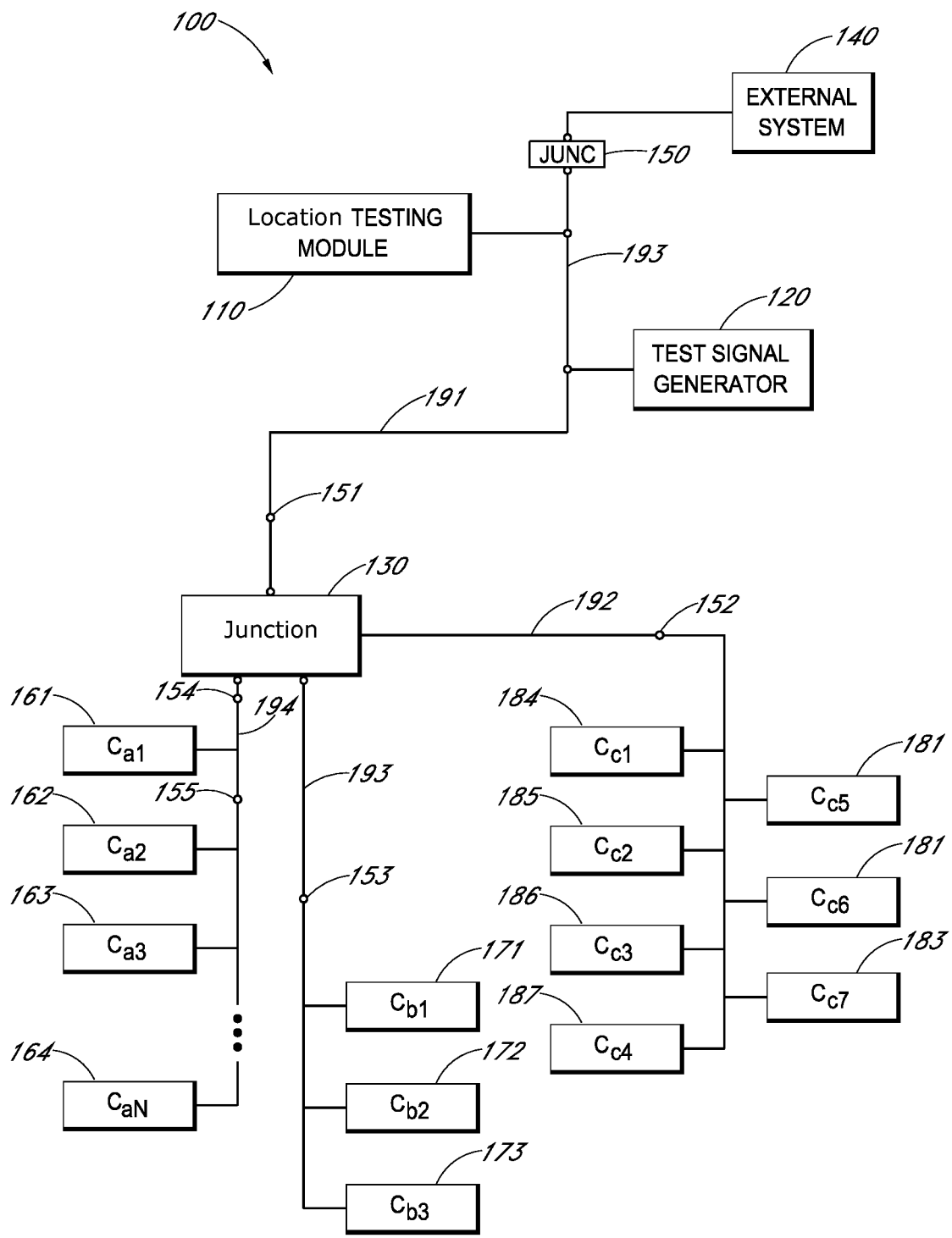
FIG. 1 illustrates a location testing module as may be employed to locate components connected in one or more groups, according to some embodiments.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed desscription.

DETAILED DESCRIPTION

This specification includes references to "one embodiment" or "an embodiment" or "some embodiments." The appearances of the phrases "in one embodiment" or "in an embodiment" or "some embodiments" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, or 35 U.S.C. § 112(f) for that unit/component.

"First," "Second," etc. As used herein, these terms are used as labels for nouns that they precede, and do not imply any type of ordering (e.g., spatial, temporal, logical, etc.). For example, reference to a "first" PV module or other component does not necessarily imply that this PV module or other component is the first module or component in a sequence; instead the term "first" is used to differentiate this PV module or component from another PV module or component (e.g., a "second" PV module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

This specification describes systems, process, and articles of manufacture involving mapping locations of electrical devices connected in array configuration. The array of devices being mapped may be a single branch of connected devices as well as a plurality of branches connected via one or more connecting nodes. Exemplary explanations, which include PV modules and microinverters, follow. Permutations on each example may also be considered and some are provided, while still more are possible.

Turning now to FIG. 1, it illustrates a schematic of a location testing module as may be employed to locate components in one or more groups, according to some embodiments. Labelled in FIG. 1 are the system topology 100, location testing module (LTM) 110, external system 140, junction 150, cabling 191-93, test signal generator 120, sensors 151-155, junction 130, wired components 161-163 through 164, wired components 171-173, and wired components 181-187.

In embodiments, the location testing module 110 may be configured to determine the location of one or more wired components. These wired components may be connected in parallel into groupings as shown in FIG. 1. There may be different numbers of components in each grouping and the components may be identical to one another, have similar topologies but not be identical, have the same or different function, and may have other variances as well. While the LTM 110 is shown apart from each of the components to be located, in embodiments, an LTM may be located in one or more of the components as well, the LTM may also be a handheld device that may be pluggable for direct or remote system testing. The junction 150 may serve to monitor connection or other status of the external system 140. The junction 150 may also serve to couple and decouple the remainder of the topology shown in FIG. 1 from the external system 140. The junction may also serve a sensing function to provide voltages, currents, frequencies, or other measurements associated with electrical exchanges to and from the external system 140.

In operation, the LTM 110 may coordinate testing at one or more of the components to determine the relative position of the tested components to other components in the group and the location as between groups as well. This testing may include having components locally sample a voltage, current, frequency, or other variable at a planned instant of time or during some narrow range of time and then determining, using these samples, the relative position of one or more of the components. The testing may also include using different voltages, currents and frequencies as part of a testing protocol. To coordinate sampling, an alert may be sent by the LTM 110 to have one or more of the components auto-sample at a target time or period of time. During this target time or period of time the junction may decouple the external system 140 and the test signal generator 120 may send a test signal to the components over cabling 191, 192, 193, and 194. The test signal may be sent to fewer than all of the cabling past the junction 130 if, for example, only one of the groups of components is being tested.

At the predetermined time or period of time, each component may measure the received signal and subsequently report the signal value measured by that particular component. The LTM 110 may use these measured signals to determine the relative position of components in a group, whether a component is in a first group, a second group, or a still different group, etc. and for other reasons as well. The LTM may make these determinations by comparing observed values measured and ranking the observed measured values. Components reporting values falling within a first range may be considered to be in a first grouping, components reporting values falling within a second range may be considered to be in a second grouping, etc. Also, within ranges components may be further ranked as being closer or further from the junction 130 or other device depending upon the observed and reported value measured during the target time period.

Sensors 151, 152, 153, 154, and 155 may also be employed to verify reported values from the components, to provide relative objective readings, and for other reasons as well, such as determining the status of the cabling connected to the components being located. The components in a grouping are preferably connected to each other in parallel. These groupings may share a junction 130 or use other topologies as well. In embodiments, therefore, when an external system is decoupled or otherwise determined to be inactive, an LTM 110 may operate to determine the grouping of a wired component, the relative position of components in a grouping, and report these findings outside the local system for various uses, including verification of system construction, versification of system operation, and for other reasons as well.

In embodiments, if a first round or subsequent round of testing is inconclusive or wants to be made more accurate, the LTM may adjust one or more of: testing voltages, testing currents or testing frequencies in order to hone in on appropriate testing delineations to identify groups apart from other groups of components being tested, to locate individual components relative to other individual components, and for other reasons as well.

Figure 2:
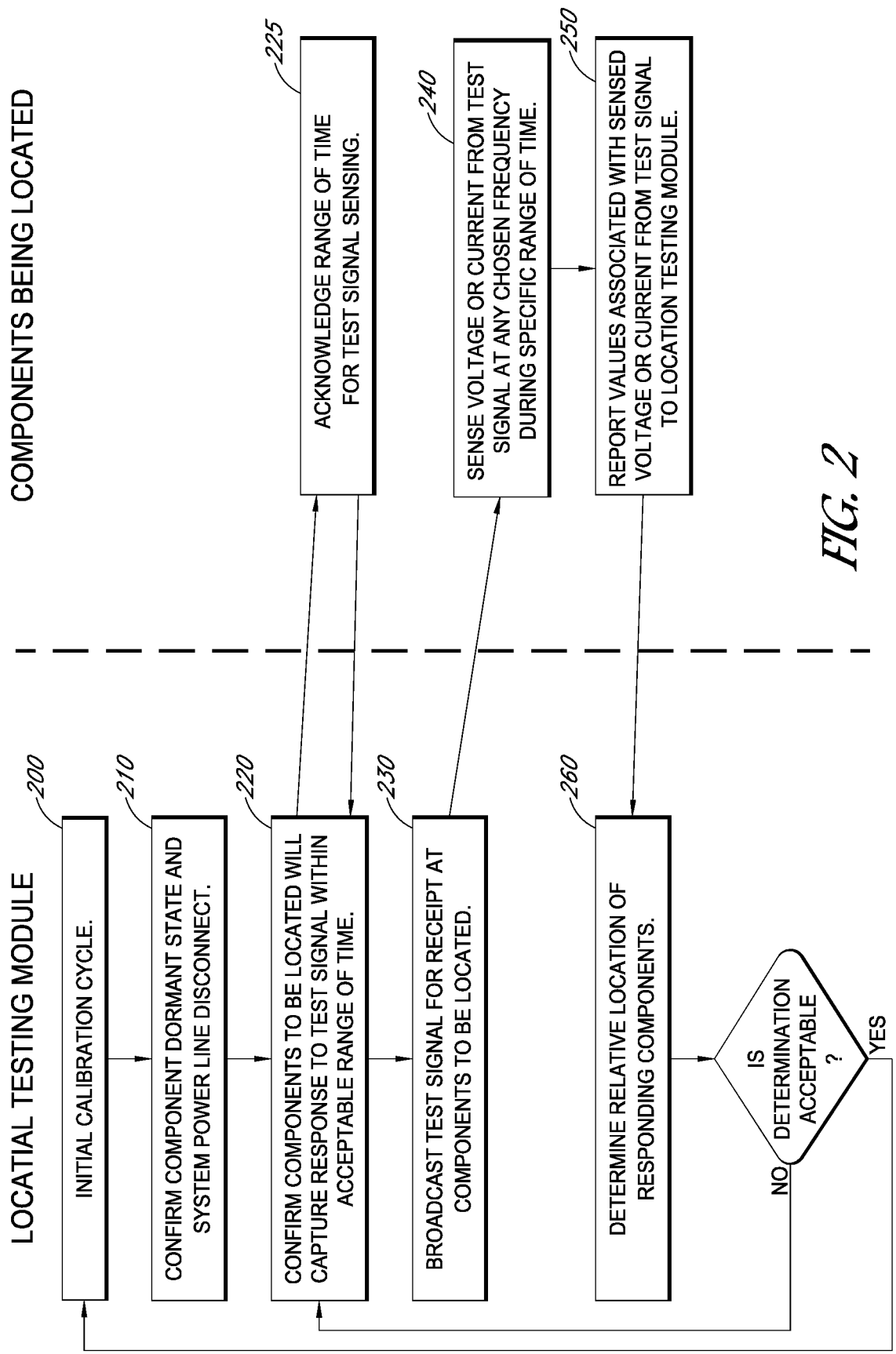
FIG. 2 illustrates a process for locating components in one or more groups, according to some embodiments.

Turning now to FIG. 2, a flow chart illustrating a method, according to some embodiments, for detecting locations of grouped components is shown. The method of FIG. 2 can include additional (or fewer) blocks than illustrated. For example, in some embodiments, acknowledging the range of time at block 225 may not be performed or may also (or instead) be performed before block 260. As shown at block 200, a calibration cycle may be initiated by a device performing functions of a location testing module. When cabling connecting components serves multiple purposes, e.g., testing and power transmission, a dormant state may be confirmed by the device performing LTM services. System line disconnect may also be confirmed, as shown at block 210. Block 220 shows that a confirmation signal may be sent to the components to be located. This confirmation may be authorized or initiated by an LTM and may serve to confirm that components being located will listen for a test signal at a certain instant or time period. Block 225 shows that components to be located may affirmatively recognize receipt of the instructions to sample and also acknowledge the actual range of time in which the sampling will occur for the component. This, may, for example, be timed using clock cycles as well as other timing methodologies. Block 230 shows the LTM or device performing its functions may broadcast a test signal for receipt by components to be located. As shown at Block 240, components listening for the broadcast signal may sense a voltage, current, frequency, or other variable during the test time period or instant. At Block 250, these components may then report the tested variable back to the LTM, to a central location for saving, combinations thereof, and to other locations as well. Upon review of the reported sensed values, the LTM may determine relative locations of one or more components as well which grouping certain components are expected to be found. The relative grouping may be determined by observed voltages in a first range, where all modules reporting voltages in the first range may be considered to be in a first group. Then, relative position within a group may be determined by ranking the reported values highest to lowest, lowest to highest, or some other suitable chronological order. This ordering may serve to describe the relative position within a group for a certain component. E.g., because component d reported an observed voltage of 0.0034V and component r reported an observed voltage of 0.0039 V, component d may be considered to be further away from the LTM than component r.

Once determinations are performed, if acceptable results are reached, the calibration cycle may be started again and if unacceptable results are reached the process may cycle back to Block 220 and perform steps subsequent thereto. Adjustments may also be made before, during, and after iterative test cycles, For example, if a first round or subsequent round of testing is inconclusive or wants to be made more accurate, the LTM may adjust one or more of testing voltages, testing currents or testing frequencies during performance of block 230 or at other times as well, in order to hone in on appropriate testing delineations to identify groups apart from other groups of components being tested, to locate individual components relative to other individual components, and for other reasons as well. Thus, a first iterative test may be performed at a first voltage frequency, the frequency may be adjusted for a second round of testing, and the results compared to determine accuracy of the iterative tests as well as the possible need for testing at third frequency or voltage or current or other variable. By performing multiple iterative testing, the LTM may identify a preferred testing setup for the topology being tested. Thus, if one or more components goes offline or otherwise changes the order of a grouping, the optimized testing settings from earlier tests may be used by the LTM to determine which component is malfunctioning as well as if the groupings have changed in some way, e.g., the addition of another component in a grouping, the addition of a new grouping, and the removal of a grouping.

Figure 3:
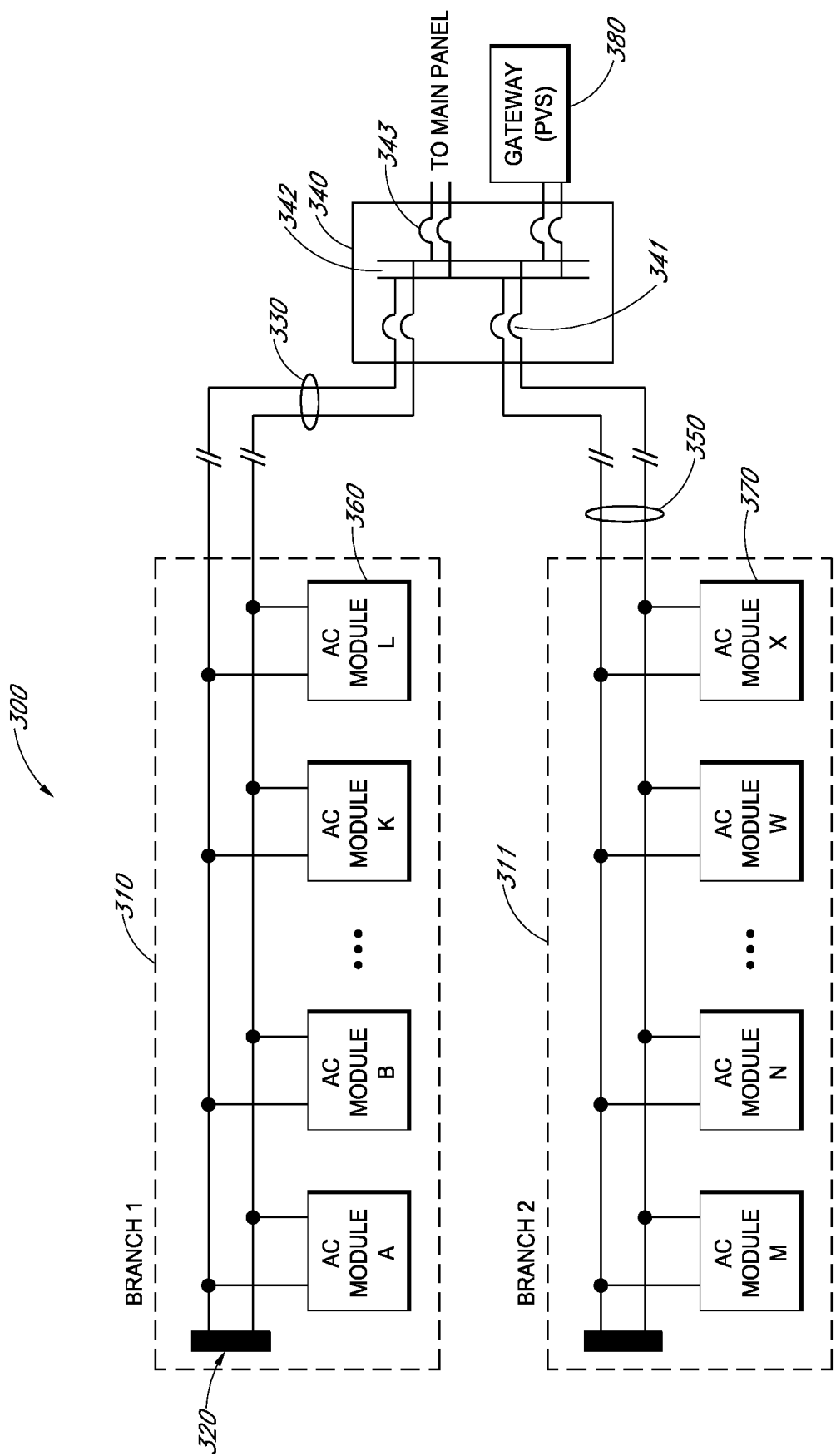
FIG. 3 illustrates a PV Module system, according to some embodiments.
Figure 4:
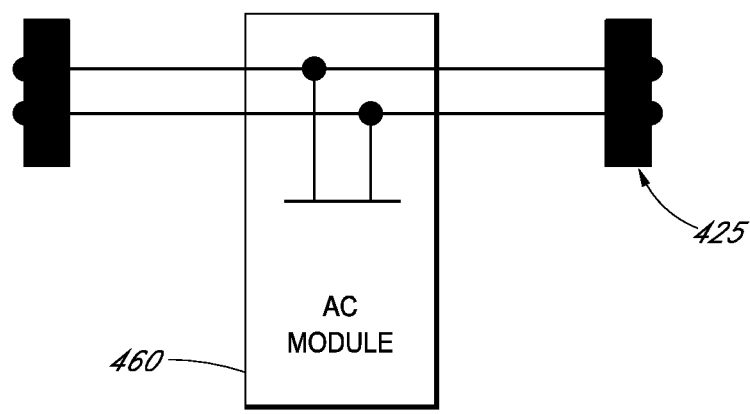
FIG. 4 illustrates a PV Module with daisy chain connections, according to some embodiments.

FIG. 3 illustrates an alternating current PV Module system 300, according to some embodiments. In a system of PV Modules e.g., 360 and 370, wherein the modules comprise local inverters for converting the DC voltage from the PV panel to an alternating voltage, the modules are distributed among one or more branch circuits 310 and 311 as shown in FIG. 3. In this example, each of the two branches contains 12 alternating current PV Modules, labeled A-L and M-X, respectively. The modules typically have one of two types of connections to the branch circuit. As shown, a "trunk" system is employed, where in a main cable is the trunk and each PV Module has a dongle to connect to the trunk. At the end of each trunk there is an end cap 320 to protect the end of the cable. Other connection techniques, linking the PV Modules to each other, may also be employed. These connection techniques include a "daisy-chain" method, where a dongle and trunk connection are embodied within the PV Module's microinverter and the microinverter itself has two ends of the AC cable coming out, each with its own connector. This daisy chain connection technique is shown in FIG. 4. Thus, multiple daisy-chain microinverters can be strung together to build a branch circuit 310 and 320, also typically requiring an end cap 320 on the "last" module in the branch to close off the normally exposed connection.

In both connection techniques, the "first" PV Module (L or X in FIG. 3) must interface ultimately to the subpanel 340 shown. To accomplish this, a "whip" cable 350 to adapt each branch circuit connectors to bare wires or other connectors, may be employed. In embodiments, the whip cables may have a mating connector on one end and stripped/exposed wires on the other.

After the whip cable 350, in embodiments, AC wires may extend from the rooftop (typically a roof, though may be any mounting surface some distance from the subpanel) to the subpanel 340. Embodiments may employ "drop" cables 330, which are shown in FIG. 3. The breaks in the lines shown in FIG. 3 indicate that a comparatively long distance may be traversed by the drop cable 330. For example, the module-to-module connections may be a few feet in length, but the drop length may be 50 feet or significantly more in length. To connect the whip cable to the drop cable, embodiments may employ a transition box, which may include a small electrical chassis that houses the splices between the whip and drop cable. Alternatively, the whip and drop cables may be fully "connector-ized" so that no transition box is necessary. Indeed, in embodiments, the whip cable 350 itself may actually be long enough to serve the purpose of the drop cable as well. Also, one may string together several connector-ized drop/whip cables to achieve whatever desired length.

The drop cable, which may be housed in a conduit that may not be necessary for each branch circuit, depending on the cable design, is shown as terminating into a subpanel through circuit breakers 341. This subpanel may be called an aggregation or "agg" panel. The subpanel combines the current from the branch circuits through the bus bars 342 as shown and provides a larger breaker 343 to the main service panel. In embodiments, if the wires are housed in proper conduits, it may not be necessary to provide very large breakers, though it is probably considered good practice to provide a safety margin when sizing these breakers.

Also attached to the subpanel is a gateway device, or PV Supervisor 380. This gateway device 380 may be connected via a breaker and be equipped with powerline carrier (PLC) communication capability so that it may communicate electrically with the PV Modules. Other communication techniques, such as wireless or dedicated wires are also possible.

The entire system of FIG. 3, may be disconnected from the main power grid via the large breaker 343 to the main panel, or via a breaker in the main panel itself. In embodiments, during testing, the AC lines may not be energized, but the gateway device 380 may still be powered via a dedicated source (such as a power outlet or battery). As such, communication while the PV Modules are not connected to the grid is possible, assuming the PV Modules have sufficient sunlight or other source of power.

In embodiments, the gateway device 380 may be housed with the subpanel 340 to form a single unit. This combined approach may allow fewer circuit breakers and the addition of other circuitry, such as switches/relays, sensing, and another signal circuitry.

In embodiments, an installer or owner of a PV module system may desire to know the exact electrical schematic (or "map") of the system 300. For example, as shown in FIG. 3, module A connects to B and B to C and so forth. Each module would have a unique identifier (e.g., serial number). It is useful for maintenance, troubleshooting, and system monitoring to know the interconnectivity of the modules. Furthermore, it may also be useful to confirm that no more than an allowed number of modules are on any one branch circuit. For example, breaker ratings may serve to limit the number of microinverters on a branch circuit. For example, 12 modules per 20-A (rated) branch circuit may be allowed by the National Electric Code, due to a 320 W rating for each module. Consequently, embodiments may be employed that confirm the maximum number of PV modules for a branch circuit have not been exceeded. Moreover, a correct number of installed PV modules for each branch circuit may also be verified in embodiments. Thus, consistent with the above descriptions, embodiments may use the physical characteristics of alternating current PV Module microinverters and the branch circuit wiring for purposes of locating AC PV modules in an array.

Consistent and different cycling voltages may be used as test signals in embodiments. These test signals may be generated in various locations in embodiments. These can include with the LTM in a centralized controller, as a stand-alone unit, and as part of one or more of the components to be located.

Figure 5:
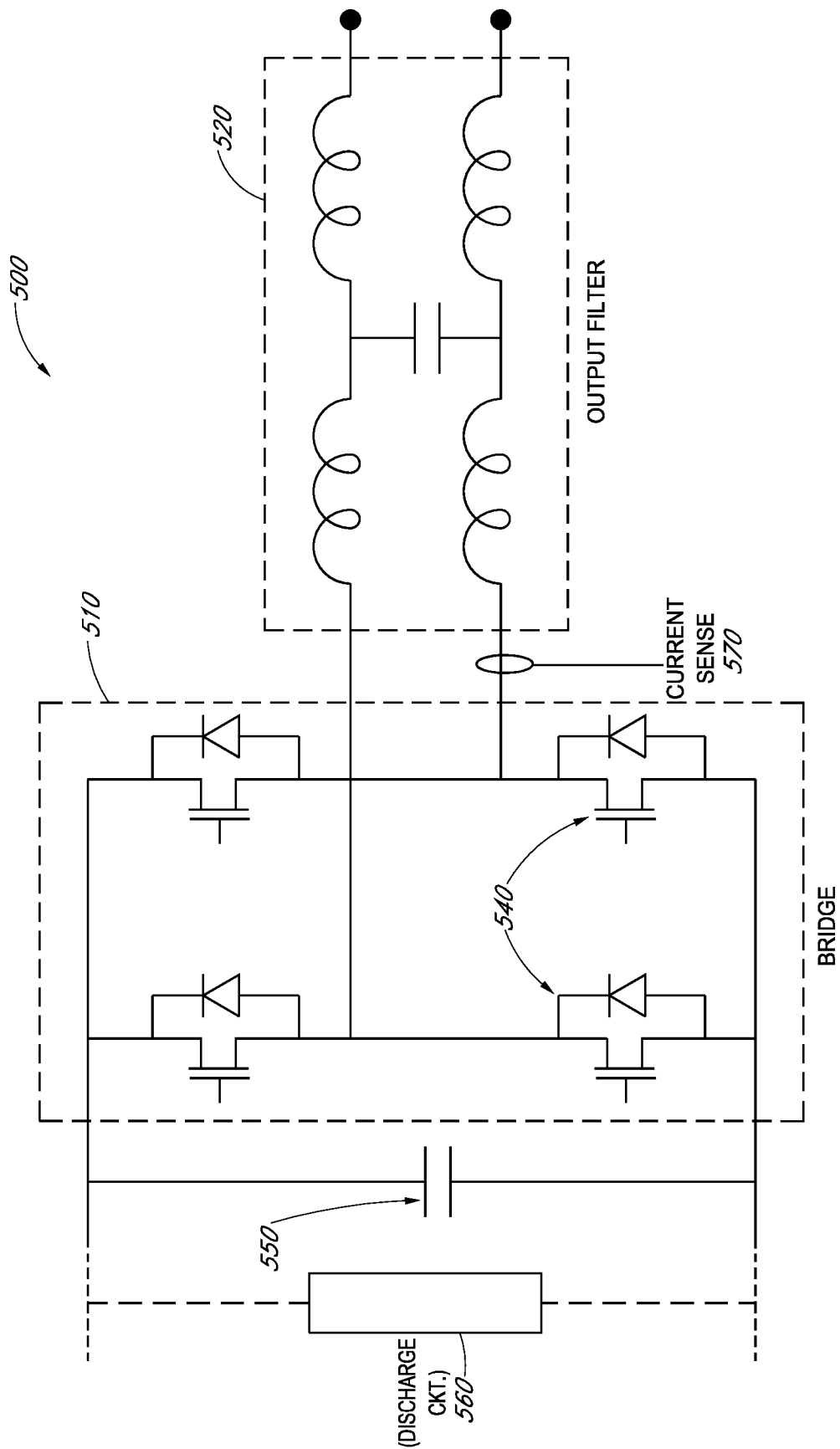
FIG. 5 illustrates a microinverter output stage, according to some embodiments.

FIG. 5 provides a high-level schematic of the output stage of a typical microinverter, which may be used in embodiments as a test signal generator. This schematic is illustrative and does not limit the various other circuit topologies that may be employed as a test signal generator. FIG. 5 shows a portion of an inverter circuit 500. The portion 500 represents an output stage topology and has a bridge stage (H-bridge) 510 with four power MOSFETs 540, whose built-in diodes are shown explicitly. Naturally, these MOSFETs can be a variety of other semiconductor devices, but it is assumed that whatever device they may be, they have a diode function as shown. The bridge connects to the output (initially the trunk or daisy chain cable, ultimately the AC grid) via an output filter 520. This filter is configured to mitigate the high frequency switching noise that is produced by the bridge. Or, in the case of a low-frequency bridge (like an "unfolding" bridge), the filter may just serve to reduce the electromagnetic interference (EMI) and not specifically target the switching of the bridge. In any case, the output filter is typically a low-pass filter and can be in many configurations, though a simple LCL "T-filter" is shown and may be employed.

Also shown is a bulk capacitor 550 that provides a substantially constant voltage to the bridge during normal inverter operation. A discharge circuit 560 is also shown—this may be an explicit circuit or just the parasitic resistance of the capacitor and other parallel circuitry. In effect, the discharge circuit 560 will discharge the bulk capacitor, usually slowly, in absence of a charging means. For example, when the microinverter has been inactive for some time, the bulk capacitor voltage will typically be near zero volts.

Also shown is a current sense function 570, which may be a small resistance coupled to an amplifier. This sensor may be used to monitor a proxy for the microinverter output current. It is possible to place the current sense on other wires with similar effect. Voltage sense functionality may also be employed or employed instead of current sense functionality in embodiments.

Figure 6:
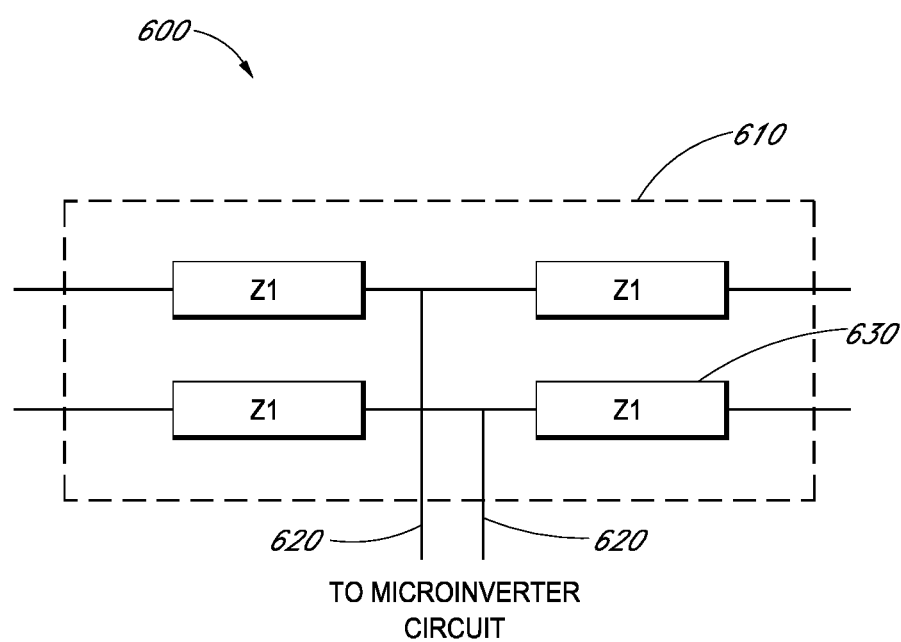
FIG. 6 illustrates a schematic of branch cable segments and associated impedances, according to some embodiments.

FIG. 6 shows the impedance structure of a branch circuit to be tested in embodiments. FIG. 6 illustrates branch cable segment 610 impedances 630, according to some embodiments. In FIG. 6, an impedance, Z1, is used to represent the impedance of a cable segment of either the trunk cable or daisy-chain cable, as discussed above. Although shown as four equal impedances, they could be somewhat different, though would likely be substantially the same for a uniformly spaced array of identical PV modules. Each PV Module microinverter or other component being located contributes to the branch segment impedances as shown in FIG. 6. Inside the larger array, the segments accumulate and ultimately attach to end caps, and to the whip and drop cables as shown in FIG. 7.

Figure 7:
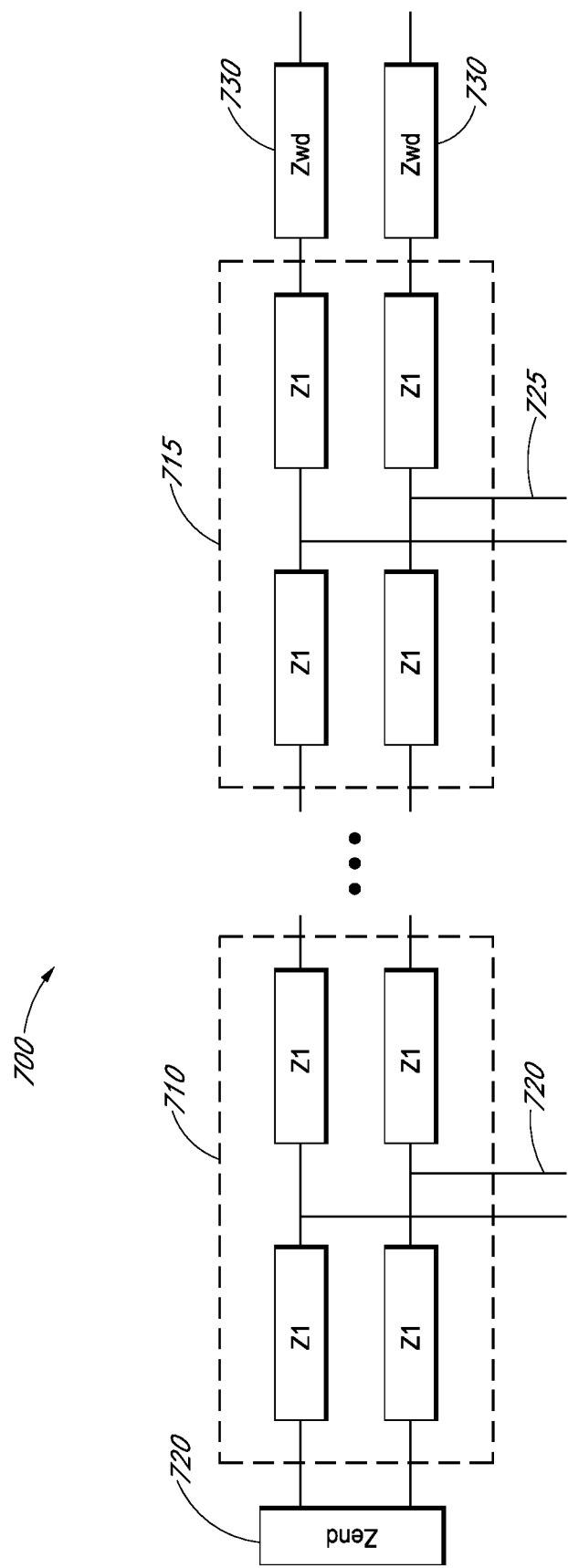
FIG. 7 illustrates an accumulation of a branch circuit network and associated impedances, according to some embodiments.

FIG. 7 is a schematic of an accumulation of a branch circuit network of impedances, according to some embodiments. As seen in FIG. 7, the end cap impedance 720 (if any)

is included. Zwd 730 represents the combined impedance from the whip and drop cables. In embodiments, it may be that Zwd>>Z1, when the whip and drop cables are much longer such that the cable impedances in embodiments may be dominated by resistance and inductance in test signal frequency ranges of interest.

In embodiments, for branch circuits connected in parallel at the subpanel bus bars, there is another network of impedances as shown in FIG. 7. For example, a given PV Module from a first branch has at least the impedances of two whip/drop cable lengths between it and another PV Module from a second branch.

In embodiments, when microinverter output stages are employed for test signal generation, the microinverter may either operate as a passive/measurement device or as an active/signal generating device. In the active case, the microinverter output bridge (FIG. 5) may be operated to switch at a given frequency to produce a voltage into the output filter. This operation coincides with what the bridge does in normal operation, except the switching frequency and duty cycle of the switches is modulated to attempt to form a low-frequency (e.g., 60 Hz) sine wave, which may conform to a regulatory standard and may be perfect or near perfect, as output current. In this approach, it is preferred that the array is disconnected from the grid (as above, with large subpanel breaker or corresponding main breaker open, or both) and there is no requirement to produce a sine wave output. In this active mode, while disconnected from the grid, the microinverter bridge can serve to produce a high frequency (e.g., 20 kHz) square wave and provide that to the left terminals of the output bridge. The amplitude of the square wave will be equal to the bulk capacitor voltage. Therefore, there may be sufficient power available from an input stage (not shown) to charge the bulk capacitor and to produce this square wave.

In embodiments, very little power should be consumed, as the load will be simply the collection of branch and microinverter impedances, which collectively have a high impedance. It is preferred that the bulk capacitor voltage not be too high (such as 20 V) so as not to create a shock hazard and not also be too low (such as below 1 V) so that some significant voltage can reach other microinverters through the branch impedances, which can attenuate the voltage more the farther they are from the source.

In embodiments it is preferred that the frequency of the active microinverter should be high enough so that the Z1 and Zwd are significant but not so high that the output filter substantially attenuates the bridge output voltage. In embodiments, 20 kHz may be below the cut-off frequency of the output filter of the microinverter yet high enough to observe significant impedance in the branch circuit. Other frequencies and frequencies with alternating voltages as well as voltages that do not switch back and forth from positive to negative may also be employed.

The remaining microinverters may be kept inactive, meaning that they are not actively switching their output bridge to generate a test signal. They preferably, provided enough power is available from the sun or other source, may be "awake" and capable of communicating and making internal measurements.

Figure 8:
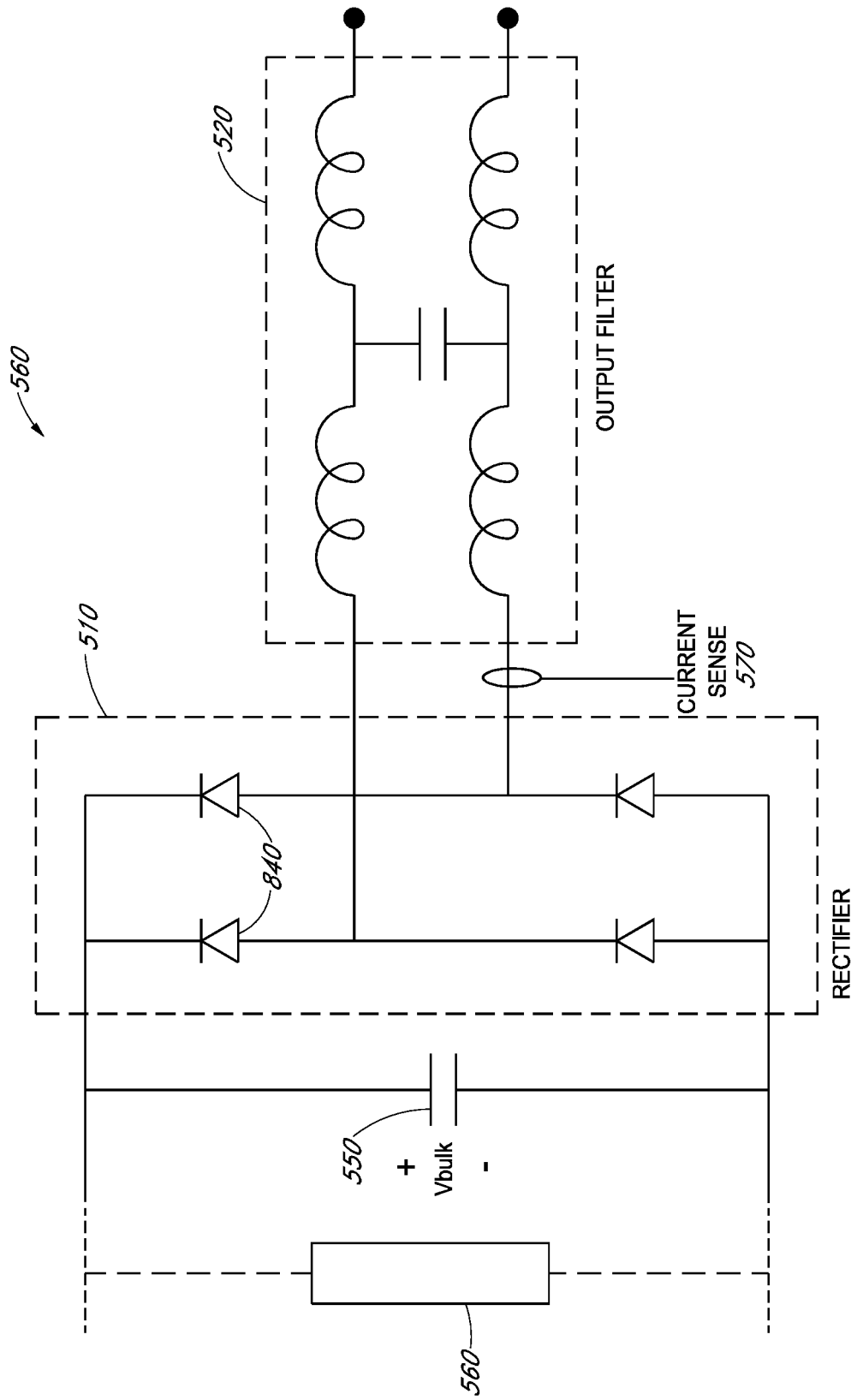
FIG. 8 illustrates topology from an inactive microinverter functioning as a peak detector, according to some embodiments.

In embodiments, an inactive microinverter can appear to the branch circuit as little more than a full-wave rectifier. As is shown in FIG. 8, with the bridge switches off, four diodes remain and the circuit of FIG. 8 forms a simple filter plus full-bridge rectifier. In use, AC voltage present at the output of the microinverter in some embodiments can pass through the output filter and be rectified into the bulk capacitor (provided the voltage is sufficient to overcome the forward drops of the diodes once it reaches the bridge outputs). As such, by activating a given microinverter in the array to produce a high-frequency AC signal, the bulk capacitors of other microinverters can charge to a substantially DC level.

FIG. 8 also illustrates an inactive microinverter functioning as a peak detector, according to some embodiments. The inactive microinverter in FIG. 8 has MOSFETs that have been removed to illustrate that they are effectively open circuits with only their diodes 840 remaining. The remaining circuit, with these inactive switches, functions as a peak detector circuit, which can approximately detect the peak of the voltage at the microinverter output, which is shown at the right end of the output filter 520. More precisely, the voltage at the microinverter output may attenuate slightly through the output filter and be provided at the (former) output of the bridge circuit, which is now functioning in reverse as a rectifier. In embodiments, the rectifier can subtract two diode drops from the peak of this voltage and provide it to the bulk capacitor, which will remain at a substantially DC level (assuming the discharge circuit is discharging at a low rate). As this peak detecting process occurs, the voltage Vbulk becomes non-zero and some current flows through the current sensor. While this current can be used as part of the mapping process, the changes in Vbulk may also be sensed and may be more differentiated.

Figure 9:
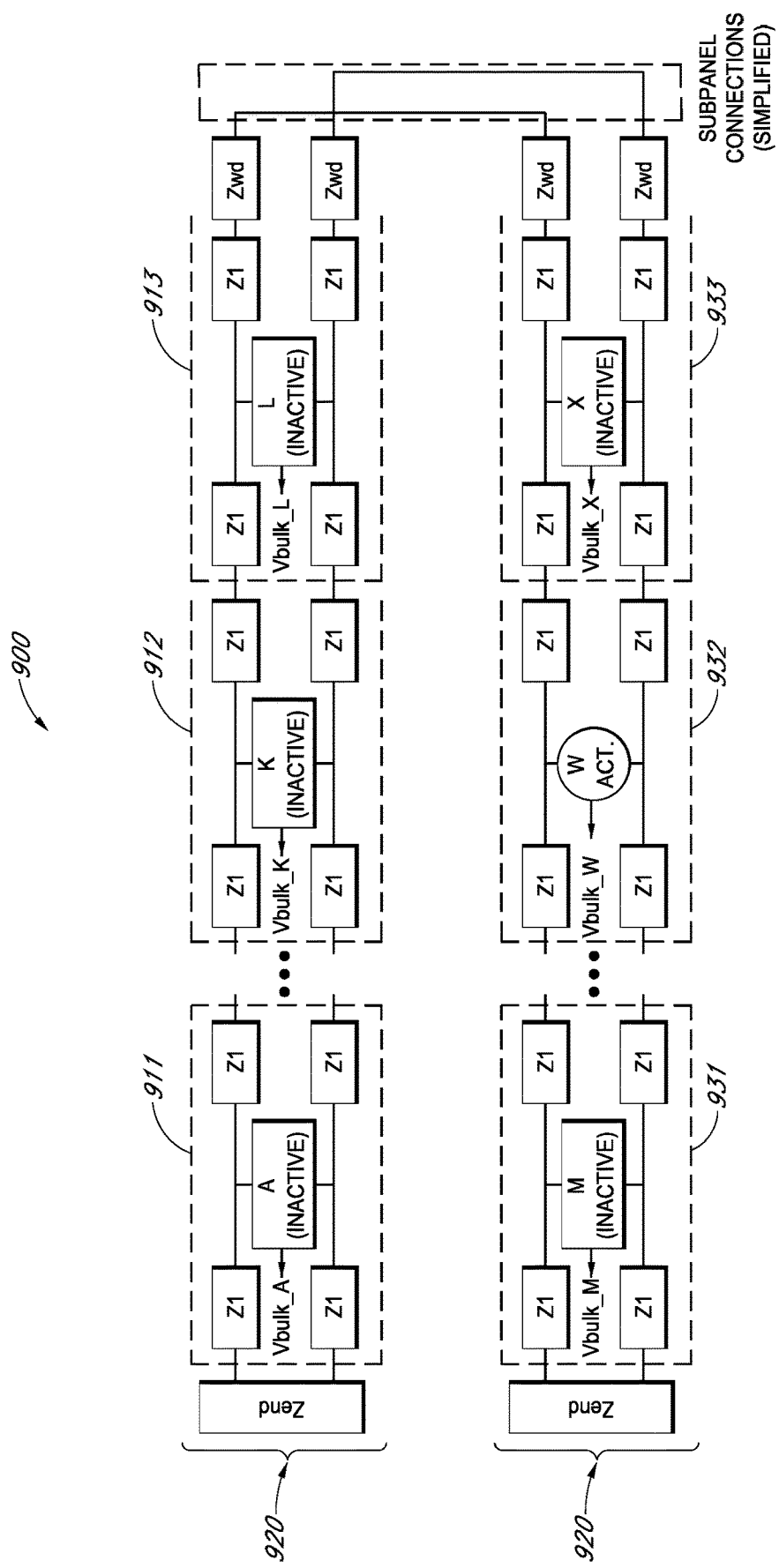
FIG. 9 illustrates a schematic of a two-branch system having various associated impedances and active/inactive microinverters, according to some embodiments.

FIG. 9 is a schematic of a two-branch system as viewed via impedances and active/inactive microinverters, according to some embodiments. As shown in FIG. 9, two branch circuits 920, 921 come together at the subpanel through their respective breakers. The ends of their drop cables are effectively connected in parallel via breakers, wires, and bus bars. In FIG. 9, for sake of example, we have assumed that all microinverters are inactive, as explained above, except for microinverter W, which is active, also as explained above. Each microinverter is show outputting a bulk voltage, such as Vbulk_A, Vbulk_B, etc.

From this diagram, one can see that the voltage provided by W, in this topology, will be received at the terminals of each microinverter by a complicated parallel/series network of impedances. As such, the bulk voltage measurements will likely be different (within measurement accuracy) as long as impedances Z1 and Zwd are significant enough at the frequency in question (e.g., 20 kHz).

The above describes how a microinverter can be used to generate a signal resulting differing bulk voltages in the other microinverters. A subsequent step is to use this data to map the array. In one approach, a microinverter, via software running in a gateway or system controller, or a microinverter itself, may be selected or may self-select. As such, the gateway or system controller or microinverter has already "discovered" the microinverters and recorded their serial numbers (which we simplify as letters: A, B, . . . etc.). Choosing any of these microinverters, such as W in this example, the gateway or system controller may send a signal to W instructing it to produce a test voltage from its output bridge (e.g., 20 V at 20 kHz, or other suitable combination). After waiting a short time, the gateway or system controller or microinverter may then poll all the microinverter (including W) to report their bulk voltages. Since polling can take time and the voltages may drift slightly, it is advisable for the gateway or system controller or lead microinverter to first issue a "snap" signal, which is a broadcast message for each microinverter to simultaneously take a snapshot of its bulk voltage measurement and store for later retrieval. In that case, the polling simply involves "picking off" the stored bus voltage measurements.

Once all measurements are retrieved, the bulk voltages can be sorted according to the value and serial number. In embodiments, the bulk voltages may be clustered and somewhat more tightly grouped. In the case of two branches, two clusters of voltages that are relatively closer may each be identified. In FIG. 3, for example, the 12 highest voltages may be presumed to be from M-X and the 12 lowest voltages may be presumed to be from A-L. This is due to the high impedance of Zwd, through which current must pass four times from W to any microinverter A-L. As such, via these clusters, embodiments can estimate that microinverters A-L are in one branch and microinverters M-X are in another branch. For purposes of determining that an allowed number of microinverters, or less, are in a given branch, a testing cycle can be finished as this can be determined simply by counting the number of units in each cluster.

The process can be further refined to attempt to identify the clusters more clearly or to identify the actual connectivity of from microinverter to microinverter by applying successive test voltages. After instructing W, for example, to apply a test voltage and polling the measurements, the gateway or system controller can then instruct W to remove its voltage. At this juncture, the bulk voltages will discharge through their discharge circuits, which may take seconds or longer. As an improvement, the microinverters could be equipped with a special command to almost instantly discharge their bulk voltages via turning on internal loads or briefly shorting out the capacitors via the MOSFET switches, or other suitable means.

After the system has returned to an inactive, zero voltage state, another microinverter can be activated with a test voltage and the process above repeated. The gateway or system controller can then cluster the voltages and may determine that all the same microinverters are on the same branch circuit. If not, then more measurements are required to identify the branch circuits more confidently. If so, then the patterns in voltage can again be analyzed for patterns that may indicate the particular arrangement of microinverters. In this case, since a first microinverter is mostly closely connected to the subpanel in Branch 2, by circuit analysis each of the voltages M-W should be lower than X. These reported values would clearly identify X as the closest microinverter to the subpanel. The remaining voltages, M-W, would be ordered from greatest to least to confirm their order is indeed X, W, V, U, . . . , M, from subpanel to end cap, as depicted in FIG. 3.

Likewise, multiple test voltage and measurement cycles can be repeated to confirm that the estimated ordering is correct, proceeding systematically through both branch circuits. Embodiments may employ iterative algorithms for more efficiently and reliably obtaining the electrical map of the array.

There may be selective considerations of topologies in embodiments. First, for certain frequencies and combinations of inverters and drop/whip cable lengths, significant resonances may develop. In such a case, the bulk voltages may not increase or decrease monotonically along the chain of microinverters. To combat this, embodiments may employ multiple frequencies to be tested to work towards identifying such behavior. Second, it is possible that a more abnormal voltage appears, possibly identifying more clusters than branch circuits or other unnatural behavior is reported back. Thus, sampling, reporting, and analysis may indicate a flaw in the branch wiring, such as a short circuit or poorly latched connector. Embodiments, may, therefore, generate an error code in such situations and instruct the installer or other user to inspect the wiring before proceeding or whenever the testing occurred.

In embodiments, it is possible to utilize additional circuitry in the gateway as a signal generator. That is, the gateway could impose a given voltage and frequency on the line with the microinverters inactive. An advantage to this approach is that the electrical location of the gateway is known, so that the gateway or system controller may have more information on which to base estimates of electrical location of microinverters. Such a technique may be combined with manual opening and closing of breakers, or automated opening and closing of switches or relays, to identify branches and connectivity of microinverters. Furthermore, the gateway or system controller may be equipped with its own peak detector circuit so that the subpanel voltage could be considered in the voltage sorting schemes proposed above.

Still further, in embodiments, the signal generator may be a PLC communication circuit itself, which produces, inherently, a high frequency sinusoidal signal coupled to the power line. In embodiments, the current sensor may also be employed using this methodology, however the PLC circuitry is considered to be preferred due to inherent accuracy. Likewise, a bulk voltage sensor may also be employed for signal generation along with the PLC circuitry.

Figure 10:
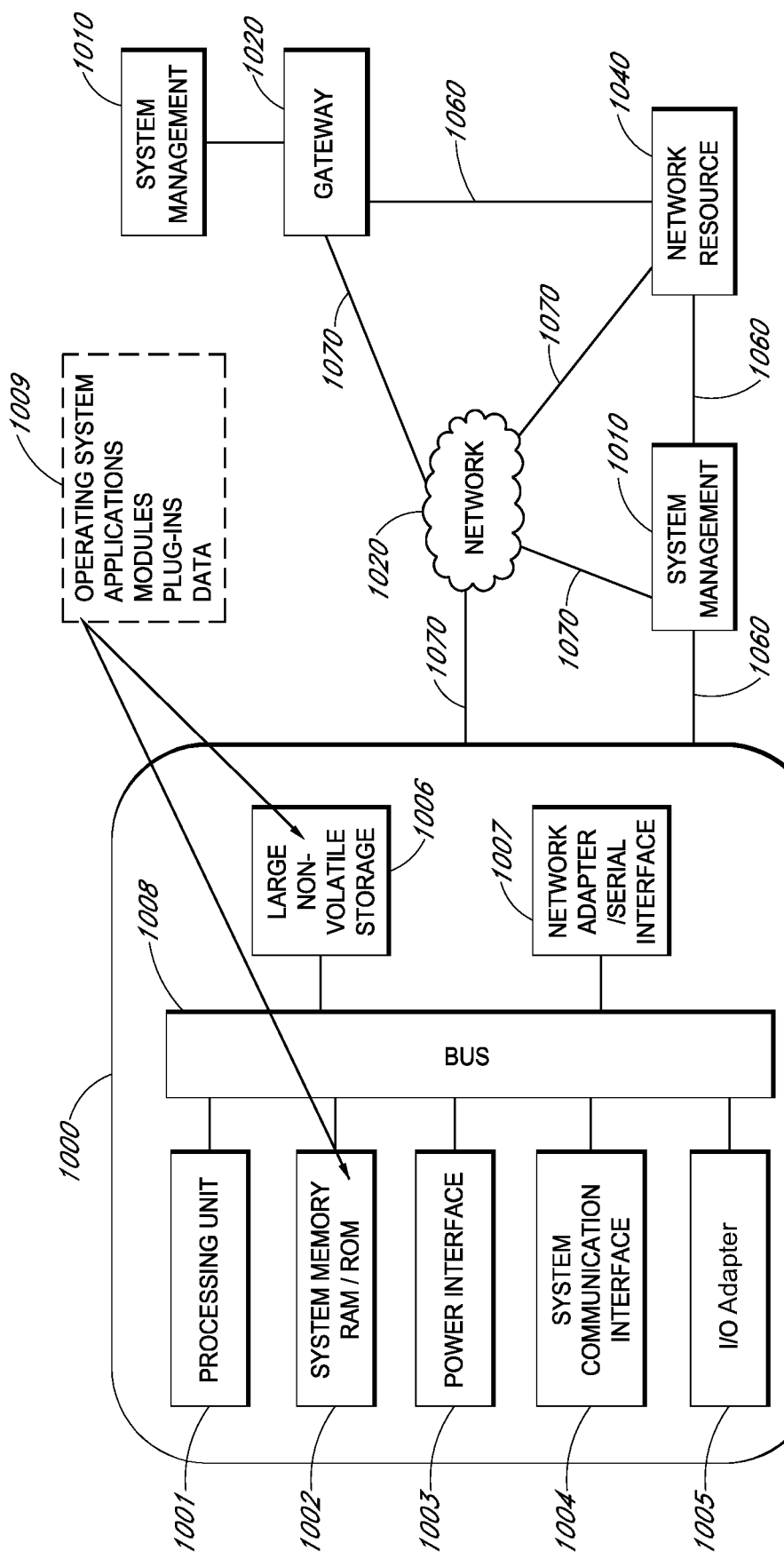
FIG. 10 illustrates a computing system and network, which may be employed for locating components connected in one or more groups, according to some embodiments.

FIG. 10 illustrates a computing system and network, which may be employed for locating components in one or more groups, according to some embodiments. The PV System controller 1000 is shown with processing unit 1001, system memory 1002, a power interface 1003, a communication interface 1004, an I/O adapter 1005, a network adapter 1007, nonvolatile storage 1006, and a bus 1008 connecting each of these components. Instructions stored on the system memory and nonvolatile storage 1006 include operating systems, applications, modules, plug-ins, and data, as shown in block 1009. The PV System controller 1000 is shown connected to network 1030 via communication pathway 1070 and connected to system management 1010 via communication pathway 1060. The network 1030 is also connected to network resource 1040 and gateway 1080. The gateway 1080 is shown connected to system management 1010 and network resource 1040. Thus, the gateway may be networked to the system controller 1000 and not necessarily in the same protective enclosure. The communication pathways 1060 may be secure pathways, such as VPNs or other private channels. The communication pathways 1070 may be public communication links such as the Internet as well as local intranet topologies.

In use, the PVS controller 1000 may manage and carry-out the location techniques described herein and report its results to system management module 1010. This system management module may be at the PV installation as well as remote from the PV installation, for example at a completely different installation site or a remote command center. The module 1010 may provide instructions to the PVS controller before, during and after testing and may provide other functionality as well. The system management module may rely on other resources to determine a course of action after receiving location reports or analysis. These resources may include maintenance services, diagnostic services, and other services as well. Thus, in embodiments, the PVS controller may carry out the location services with and without assistance from external sources and this assistance may include instructions for testing schedules, instructions for mitigation schedules, and troubleshooting assistance.

Thus, embodiments can employ various techniques to map clusters of AC modules or other power electronics that are separated by long lengths of AC cabling. As noted, various mapping processes and techniques and configurations may be employed when seeking to map power electronics, such as AC modules, positioned in one or more arrays.

An exemplary two-branch setup with twenty-four total microinverters is identified above and used in an example below. The disclosed embodiments may be used for mapping other configurations and electronic devices as well. For example, systems with fewer or more microinverters and fewer or more branch circuits can also be evaluated, and the electronic devices may be other power electronics, as well as electronics not configured for generation or conversion of power, but instead having other circuit topologies upon which a background voltage can be measured and repeated testing and monitoring as described herein can be performed.

Exemplary techniques may employ some or all of the previous as well as the following processes. Characteristics of a known power electronic circuit, a circuit such as in FIG. 1, or otherwise, may be relied upon during testing for purposes of locating the relative position of devices in which these known circuit topologies reside. For example, in embodiments the topology and specific sizes or other characteristics of a known LC output filter, such as 520 in FIG. 5, may be relied upon for purposes of testing, interpreting test results, and ultimately locating the electrical device with the LC filter, such as a microinverter, in an array of other electrical devices having the same LC filter or another known circuit with known electrical attributes. For example, in embodiments, as discussed in FIG. 12, multiple measurements of voltage or another measurable electrical attribute may be conducted over a series of frequencies for the devices to be located in the array. Resulting measured voltages or other electrical attributes may be collected and compared to each other to identify relative differences in order to reach conclusions as to the relative positions of the power converters or other devices in the one or more arrays being mapped. Conclusions as to groupings, e.g., branch location, may be a primary purpose of the mapping embodiments described herein.

Preparations ahead of a multiple frequency measurement, i.e., sweep testing, of devices to be mapped may be performed. These early preparations may include isolating the devices prior to comparing induction losses experienced through AC cabling connecting the power converters or other electrical devices that can be used for mapping purposes. This device isolation may require testing for and making adjustments for manufacturing tolerances and transient voltages of the LC circuit, or other known reference circuit, to be compared between power converters or other electrical devices. Device isolation may be conducted at the initial testing as well as at intervals during a frequency sweep to confirm or reconfirm the adjustments determined for the circuits of the devices being mapped. Device isolation may be accomplished by minimizing unwanted transient voltages in the circuits to be tested. These unwanted transient voltages may be minimized through synchronized capacitor discharge in each of the reference circuits of the devices to be mapped. A controller, for example. may send out a global instruction to each device to be mapped having them carry out specific discharge instructions at a synchronized time certain in the future. When no capacitor is located in the known reference circuit other equalizing techniques may also be used. For example, a stable voltage can be generated locally and measured at known intervals to set up a base-line reference that can be compared against. Other background setting techniques may also be employed depending upon the circuit topology. Once the transient voltages are reduced or adjusted for the mapping techniques, using frequency sweeps or other reference techniques may be employed to identify groupings of the devices as well as the order of these branch groupings.

Figure 11:
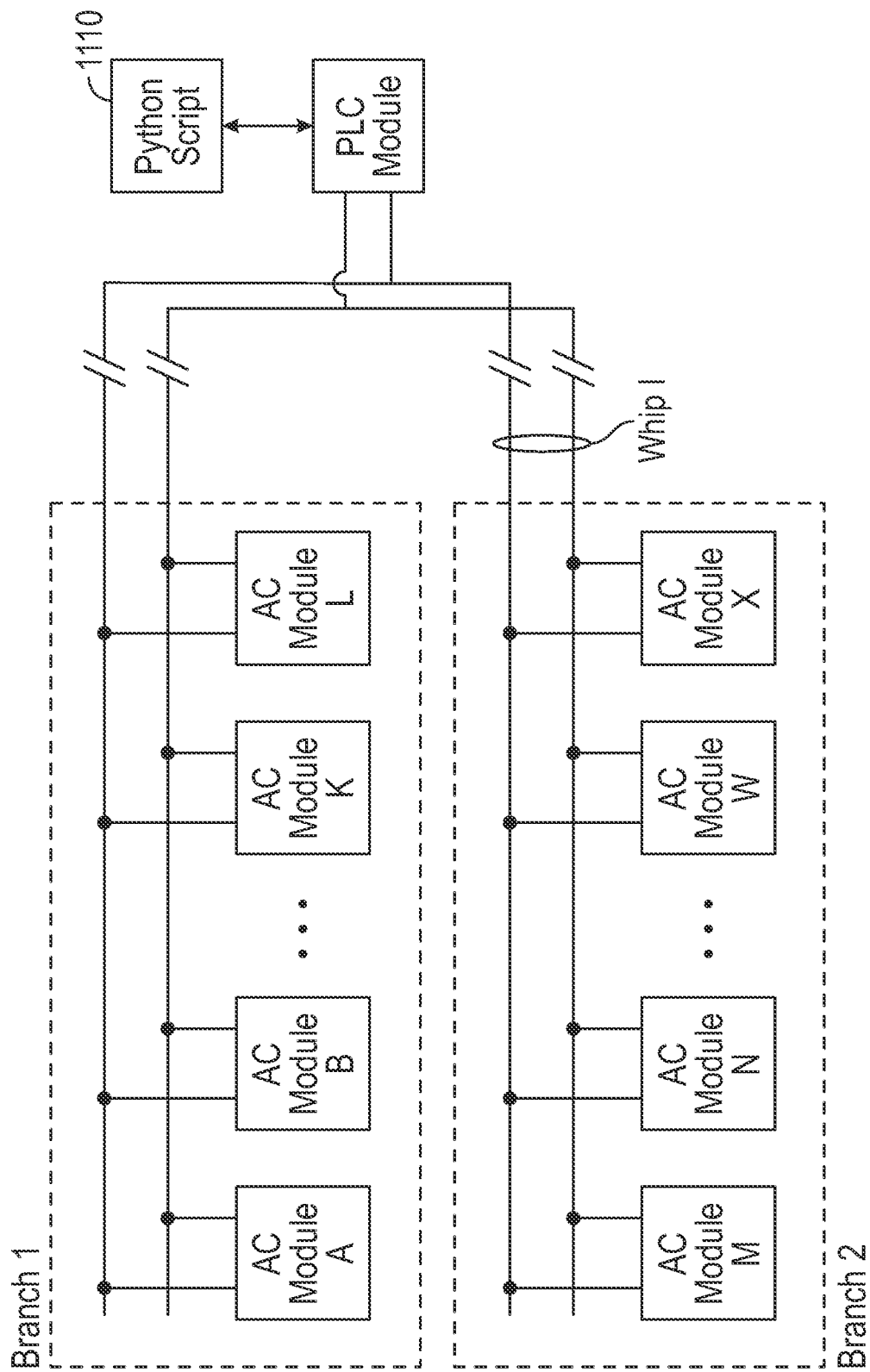
FIG. 11 shows a two branch AC module system and an exemplary topology setup of a PLC module according to some embodiments.

FIG. 3 shows an exemplary 24 microinverter system that may be mapped using the techniques and processes described herein. This 24 microinverter system, may include SunPower's Gen-3.1 microinverters. The exemplary tabular and graphical results provided in this application were generated using SunPower's Gen-3.1 microinverters and the array topology of tested system is shown in FIGS. 3 and 11, where FIG. 11 shows the effective topology when the switches of the main panel are closed. Accordingly, when the breakers of FIG. 3 are in the "ON" position the circuit simplifies to FIG. 11. Other tabular and graphical results may result when different topologies are employed and when different microinverters or other components are employed.

FIGS. 3 and 11 also show that an array may be mapped before it has been commissioned, and therefore is not connected to the grid or to a main panel. If an array was already commissioned or otherwise connected to the power grid, an isolation step would need to occur before mapping can be completed. Various devices may be employed to carry out the mapping processes of embodiments. For example, as noted above, the gateway (PVS) may be conducting portions or all of the needed sweeping and listening and other functionality described herein. In embodiments, a testing module may also be employed, as is shown in FIG. 11. This testing module (personal computer 1110 for example) may be locally employed as well as remotely employed, over a network remote from the gateway and the system being mapped. In FIG. 11 a PLC (power line communication) module connected to a personal computer 1110 running python or other testing control device is shown. Local testing may also be carried out by a local controller at the gateway, the local testing module 1110, or another local module. Remote testing may also be employed wherein array mapping control signals may be sent to the PLC module for subsequent relay to the devices of the array to be mapped. Other methods of communication may also be employed. For example, low voltage wired and wireless communications may also be conducted in addition to or in lieu of power line communications between the devices being tested and the devices conducting the testing and data gathering.

Figure 12:
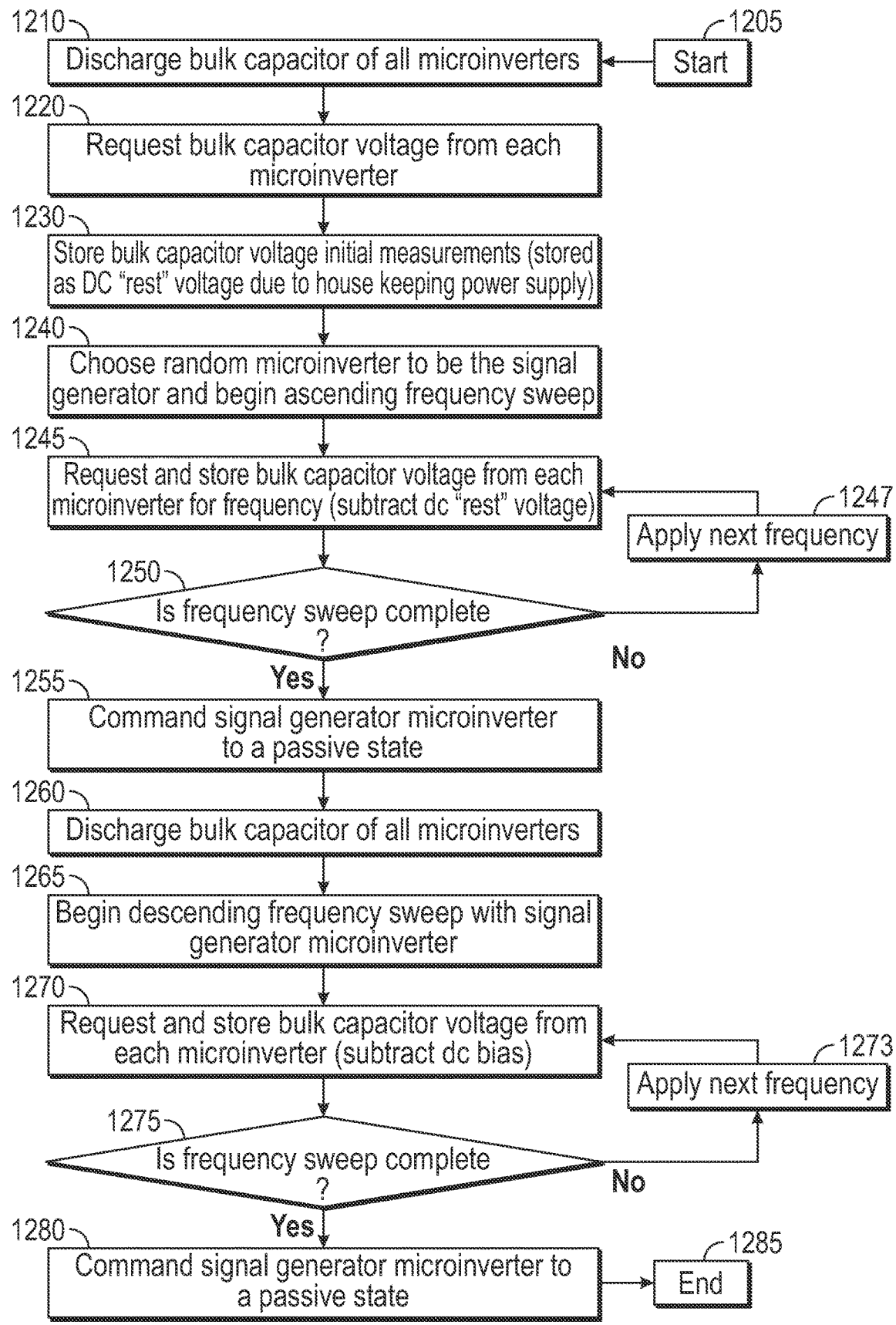
FIG. 12 shows a process for gathering data for use in a branch detection scheme according to some embodiments.

Embodiments may comprise none, one, or more than one of the aspects described herein when carrying out mapping processes, including to determine the number of microinverters or other device of an array branch or other location of an array. As is shown in FIG. 12, for example, at the outset, all microinverters or other devices may be commended to reset their reference circuits to be used in the mapping process to a known expected value. For instance, the bulk capacitor in the LC circuit of FIG. 5 for each of the microinverters of the array to be tested, may be commanded to be drained. This draining function may be active for several seconds, e.g., three, four, and five seconds, to ensure that any accumulated energy is dissipated or otherwise consumed.

In certain microinverters when the input is powered, a resident voltage of about 10 volts is present due to internal topology interconnection to the bulk capacitor (a conductive path charges the bulk capacitor to a voltage similar to the house keeping supply voltage). This resident voltage is intended to be discharged ahead of the testing and reporting of a baseline parameter to be reported by each of the devices being mapped.

After receipt of the instruction or a request for a response, each of the microinverters or other devices to be located, observe and/or determine their "rest" voltage or other measured parameter and send this baseline attribute to the PVS or other controller conducting the mapping. These discharge and reporting steps may be conducted at a synchronized time, such as the PVS sending a signal for concurrent discharge or a time certain in the future for concurrent discharge.

During early steps, and perhaps next in some embodiments, one of the devices to be mapped will be selected as a signal generator. The signals generated by this generator may be set at different frequencies and broadcast to all the devices being mapped whereby the changed electrical state for each of the devices being mapped can be measured and then compared to each other for purposes of locating the device on a certain branch and for purposes of further locating the relative location of each device on that particular branch. This selection will remove the selected device from reporting the sweeping test results as the selected device is generating the sweeping frequencies being received by the other devices being mapped and will not be in a position to receive and test signals via the connecting network. This selection may be accomplished by the PVS selecting a microinverter serial number at random to perform the function of a signal generator. This selection may also be made for a device whose location in the array is known. If such a device is available, it is preferred that the device with the known location be selected as the signal generator because fewer iterations will be likely required to map the remaining devices.

In preferred embodiments, the signal generator may apply a 50% duty-cycle square wave at a fixed frequency with an amplitude of 50 volts where the input converter of the signal generator microinverter must regulate its dc bulk capacitor voltage to 50 volts. Other voltages and duty cycles may also be employed. Once the sweeping frequency has stabilized, the PVS or other controller may request all microinverters or devices being mapped to measure their dc bulk capacitor voltage and report it via PLC, or other communication method, back to the PVS, controller, or other device identified to listen for the reported parameters. The PVS or other receiving device may record the observed voltages or other observed parameters for the given test frequency. These received voltages or other parameters may be adjusted by the device or the receiving controller to account for the resting voltage measured earlier in the mapping process. For example, a known resting voltage of 0.3 mV for device x may be deducted from an observed voltage of 3.0V for device x to yield a net observed voltage for device x. This adjustment may be conducted for each device to be mapped and at each test frequency in order to control for unique attributes of the various devices being mapped.

The test frequency may be changed and a second round of observations, reporting, and adjustments may be conducted. Repeated additional sweeps at different test frequencies may be conducted. These sweeps may be set at frequency intervals like those in FIGS. 13-16 as well as at other intervals, e.g., 50 Hz, 100 Hz, 150 Hz, 250 Hz, 500 Hz, and intervals therebetween as well as multiples (e.g., 2×, 3×, 4×, and 5×) thereof. Once all the desired sweeps are conducted and reporting is essentially or completely finished, the signal generator may be placed into a passive state and all the microinverters or other devices being mapped may be commanded to drain their dc bulk capacitors as a reset. Next, the signal generator microinverter may perform a second grouping of frequency sweeps of the arrayed devices being mapped, however this time the frequency sweep may be performed in reverse order (highest frequency first and lowest frequency last). Reporting of the measured voltages or other parameters may be reported and collected as above or below. All the microinverters or other devices may be put in a passive state and the gathered data may be saved to a file for post processing. The microinverters or other devices being mapped may also be brought back online once the reporting is completed and the analysis of the reported data is underway. When relative locations of the devices in the array are determined the controller or other location testing module, e.g. 110 of FIG. 1, may store the data as well as report the locations outside to the system and send the location data to each of the devices mapped by the location testing module.

The reverse frequency sweep can serve to identify target circuits that behave differently at higher and lower frequencies. For example, the higher frequencies may prevent complete capacitor discharge and may, therefore, not allow for accurate readings once not enough time for discharge is allowed. Therefore, by conducting frequency sweeps in both directions, from high frequencies down and from low frequencies up, attributes of a circuit topology that become unmeasurable at high or low frequencies, i.e., capacitor charging and discharging, can be identified and discounted during the analysis phase of the mapping process.

Thus, a main capability of exemplary processes can be their ability to identify clusters (e.g., of AC modules) separated by long lengths of ac cabling. While system configuration can vary from installation to installation, using installer or other configuration input, and post processes, the frequency sweep data can be employed to reveal correct clustering, and module to module schematic in embodiments. In some systems embodiments may be carried out solely with firmware changes and without added hardware or modification of hardware in installed systems.

FIG. 12 shows a process for gathering data for use in a detection scheme according to some embodiments. As can be seen, once started (e.g., box 1205), an early part of the process may include (e.g., box 1210) discharging each of the bulk capacitors of all microinverters in the system to be mapped. From there, a request (e.g., box 1220) may be sent to obtain the bulk capacitor voltage for each of the microinverters to be mapped. These requested voltages may be stored (e.g., box 1230) as initial measurements for each of the microinverter bulk capacitors. A random microinverter may then be selected (e.g., box 1240) to be the signal generator and may be commanded to begin frequency sweeps using changing frequencies. Received voltages (e.g., box 1245) from each microinverter may then be stored and rest voltages may be subtracted from the received voltages for each microinverter to calculate a "rest" voltage for the bulk capacitors. Frequency sweeps may then continue until complete (e.g., boxes 1247 and 1250). Once the frequency sweeping is complete the command signal generator may be placed in a passive state (e.g., box 1255) and the bulk capacitors may be discharged (box 1260) again. An opposite sweeping frequency may then be begun (e.g., box 1265) and the "resting" voltages for this sweeping activity may be calculated and stored (e.g., box 1270). These frequency sweeps may then continue until complete (e.g., boxes 1273 and 1275) and once complete the signal generator may be placed in a passive state (e.g., box 1280) and the process may be ended (e.g., box 1285).

Exemplary Frequency Sweep Results

Table I of FIG. 20 shows how representative data, which may be generated by the procedure of FIG. 12, and/or as described herein, may be stored by the location testing module 110 or elsewhere when conducting the multiple-frequency testing of embodiments.

As an example, the 24 microinverter set-up (configured with two 12 microinverter branches) underwent the procedure in FIG. 12. PLC monitoring tools were used to list all 24 serial numbers and those serial numbers were labeled MI 1 through MI 24. MI 1 was chosen to be the signal generator. It is prudent to note that the physical location of each MI (whether in branch 1 or branch 2) need not have a tie to the numerical assignment given to each MI. However, in this exemplary setup, the location of the signal generator (MI1) was manageable and for the first set of results it was placed in position H as shown in FIG. 1b.

Figure 13:
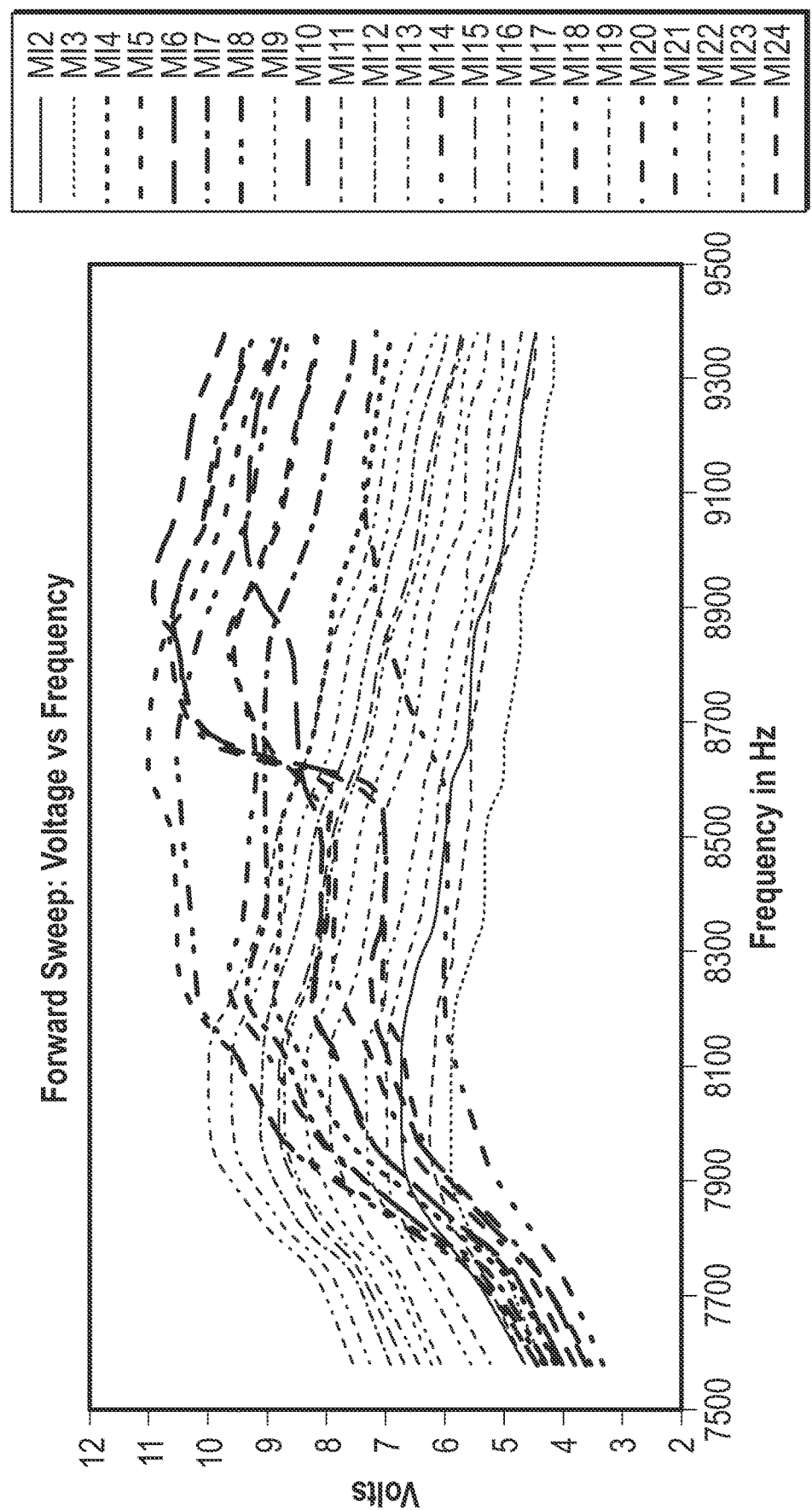
FIG. 13 shows frequency sweep results as may be encountered according to some embodiments.
Figure 14:
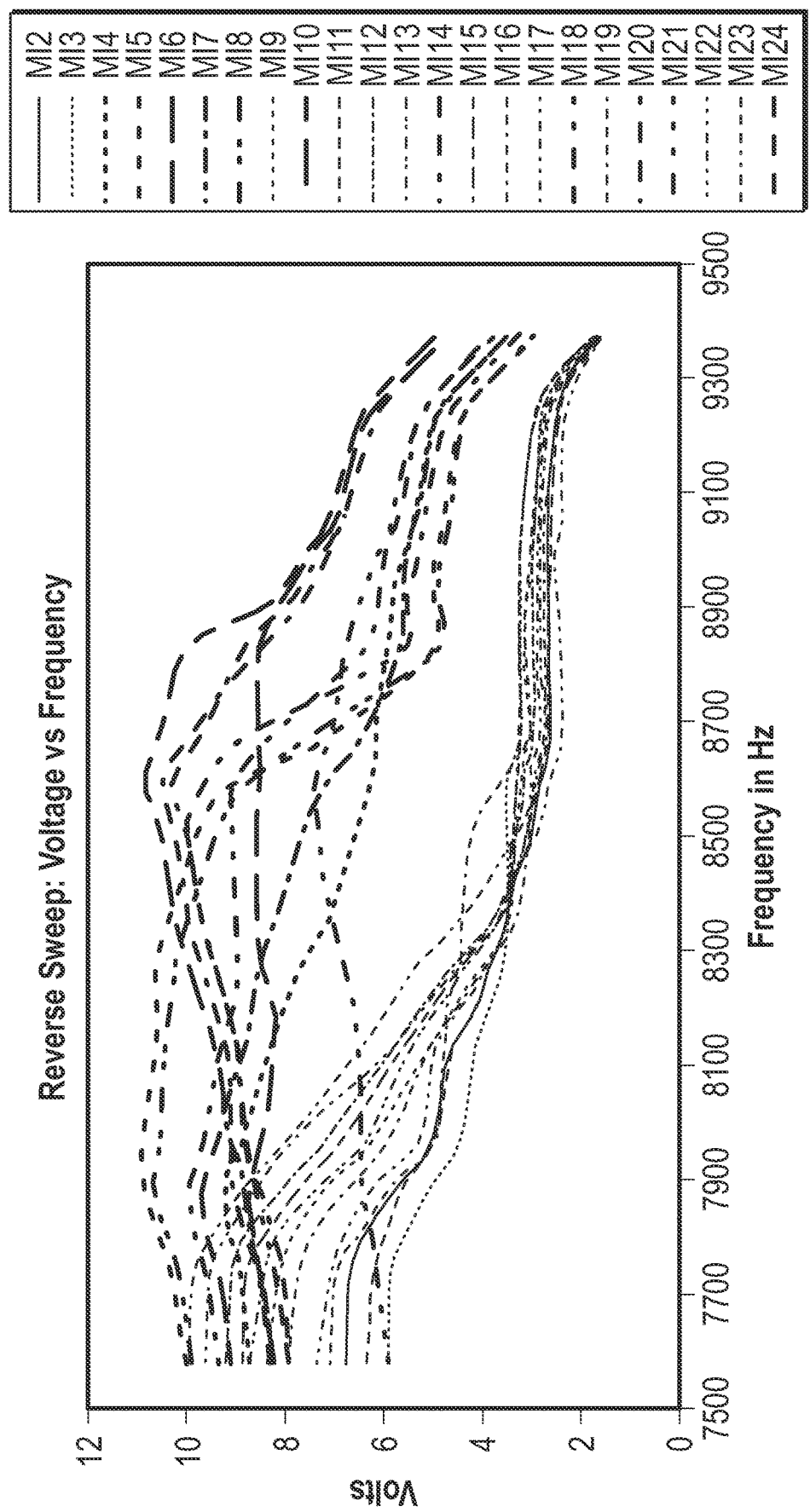
FIG. 14 shows reverse frequency sweep results as may be encountered according to some embodiments.

An exemplary tabular representation of embodiments is shown at Table I of FIG. 20. When data is gathered it may be graphed for purposes of analysis. Here, FIGS. 13 and 14 show graphed data for exemplary observed frequency sweeps going from lowest to highest frequency (forward sweep) and a second data set going from highest to lowest frequency (backward sweep).

Two or more sets of data were obtained in this example using the topology of FIG. 3, FIG. 11, and FIG. 5, since the voltage measurement is taken at the dc bulk capacitor which is essentially part of a voltage peak detect circuit. Given two data sets, the frequency sweep is approximated finding the point by point minimum for each microinverter at each tested frequency. This selection of the minimum voltage at each frequency for each microinverter, whether sweeping from the low frequencies as in FIG. 13, which shows a forward frequency sweep with a signal generator in position H of FIG. 3, or sweeping from the high frequencies, as in FIG. 14, which shows a backward frequency sweep with signal generator in position H of FIG. 3, and the results in the data plotted in FIG. 15, which shows a constructed frequency sweep with the signal generator in position H of FIG. 3.

Analysis on the minimum voltages for a range of scanned frequencies for each microinverters (where MI 1 is the signal generator in position H) may be conducted to determine microinverters of other devices belong to which branch circuit, i.e. linear array. This analysis may include an understanding that microinverters or other devices being mapped will share similar trajectories of voltage versus frequency. This shared trajectory, for microinverters of the same branch is shown in FIG. 15, where microinverters having solid lines belong to a first array and microinverters having a dashed line belong to a different array.

Figure 15:
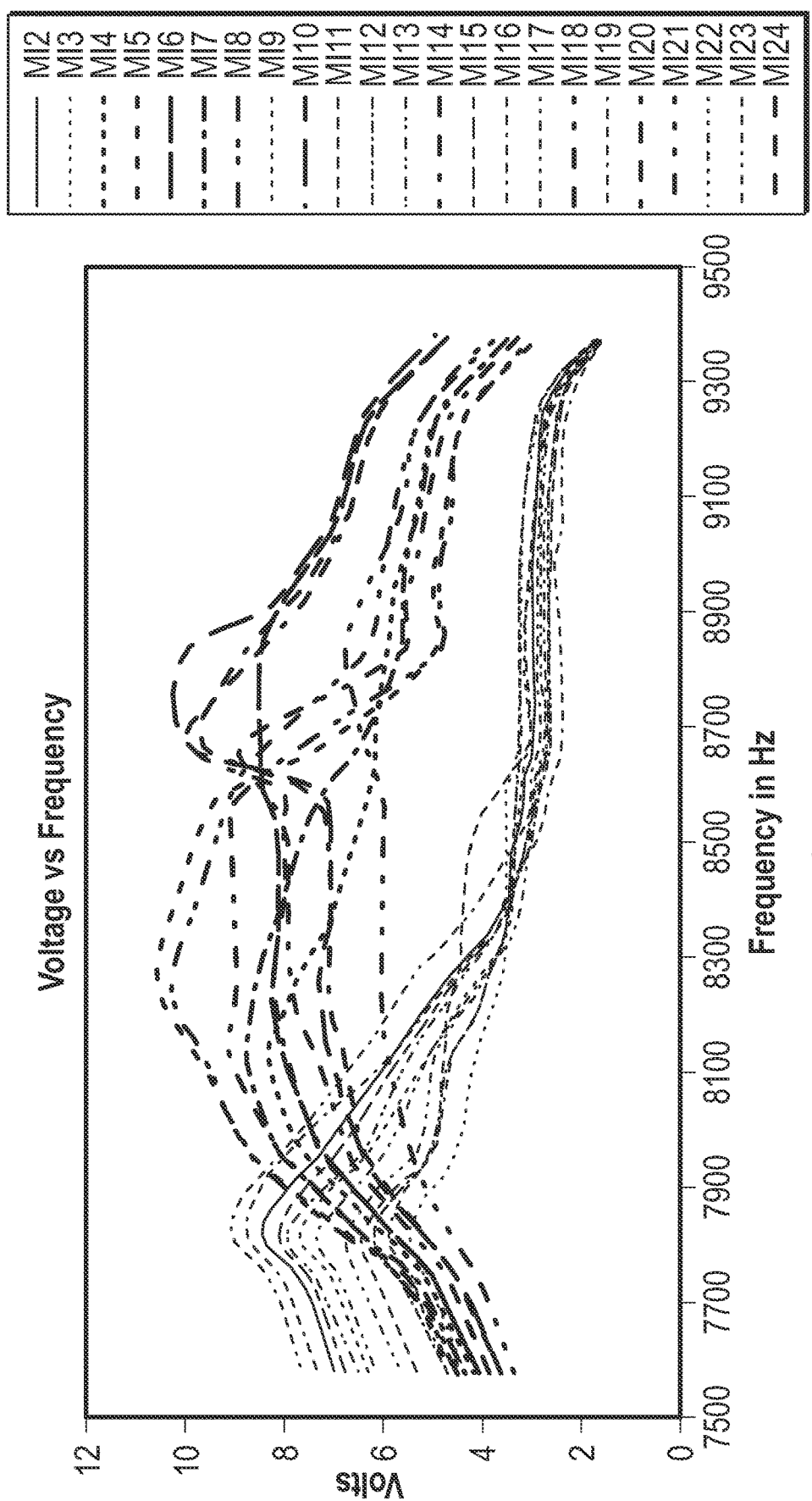
FIG. 15 shows merged frequency sweep results as may be encountered according to some embodiments.
Figure 16:
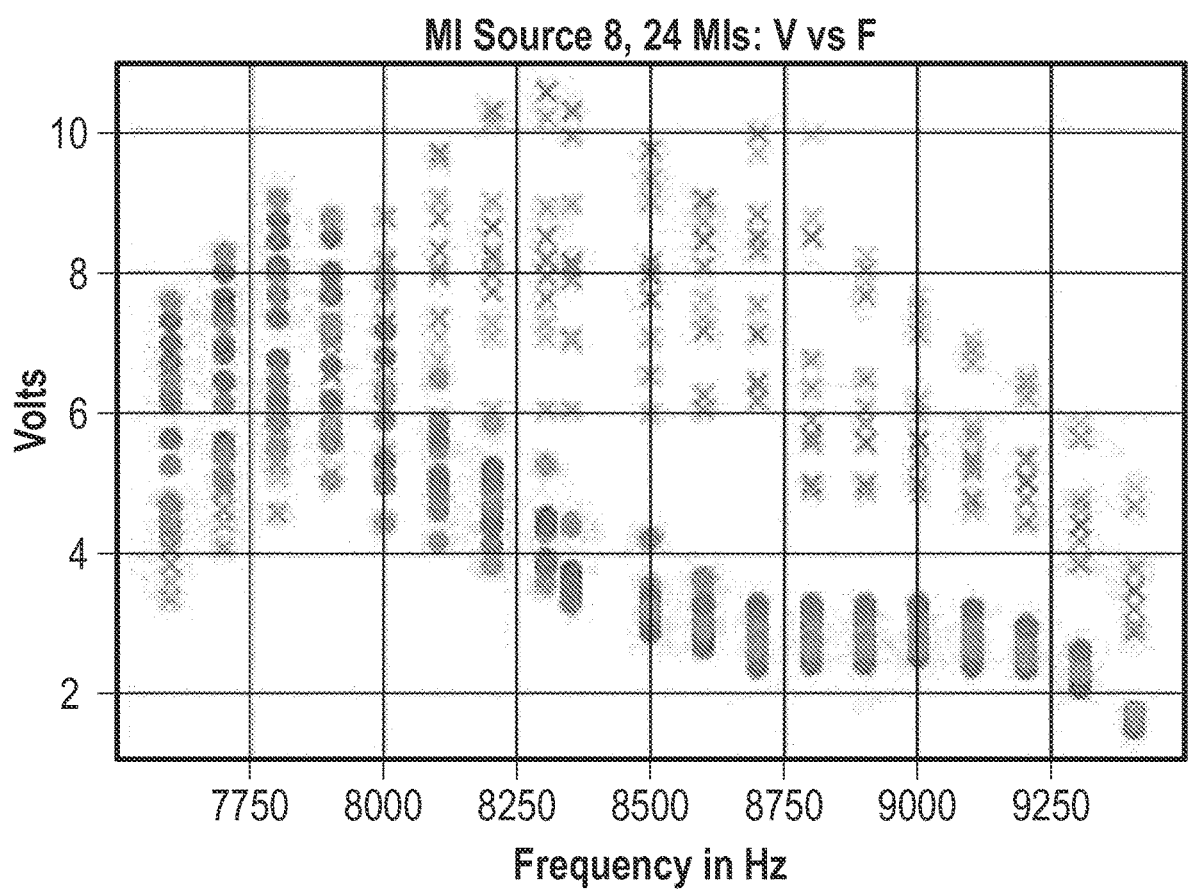
FIG. 16 shows data from a frequency sweep shown as discrete points as may be encountered according to some embodiments.

Visual inspection of FIG. 15 is consistent with this understanding as FIG. 15 reveals that the microinverters that share a branch circuit will have similar trajectories. Accordingly, embodiments may employ processes that can serve to detect shared trajectories and group them for purposes of revealing the members of each branch circuit.

While other techniques may also be employed when seeking to map the devices, embodiments may examine the possible combinations of N (24) microinverters distributed among N (two) branches. Each combination may be given a score that quantifies how tightly grouped its branches are. If all combinations are examined and scored, then a preferred expectation in some embodiments may be that the combination with the lowest score will correspond to the correct physical grouping of the microinverters. First, one combination may be considered (for example: branch 1 {MI2, . . ., MI12} branch 2 {MI13-MI24}). Second, referring to FIG. 16, which shows data plotted as single points, the standard deviation of "x's" at each frequency may be calculated and they may all be summed to yield a single value. The same may be done for the "o's," in order to yield a second value. Third, the two values may be summed to yield a single score for that combination. The process may be repeated for all possible combinations yielding a score for each combination.

Figure 17:
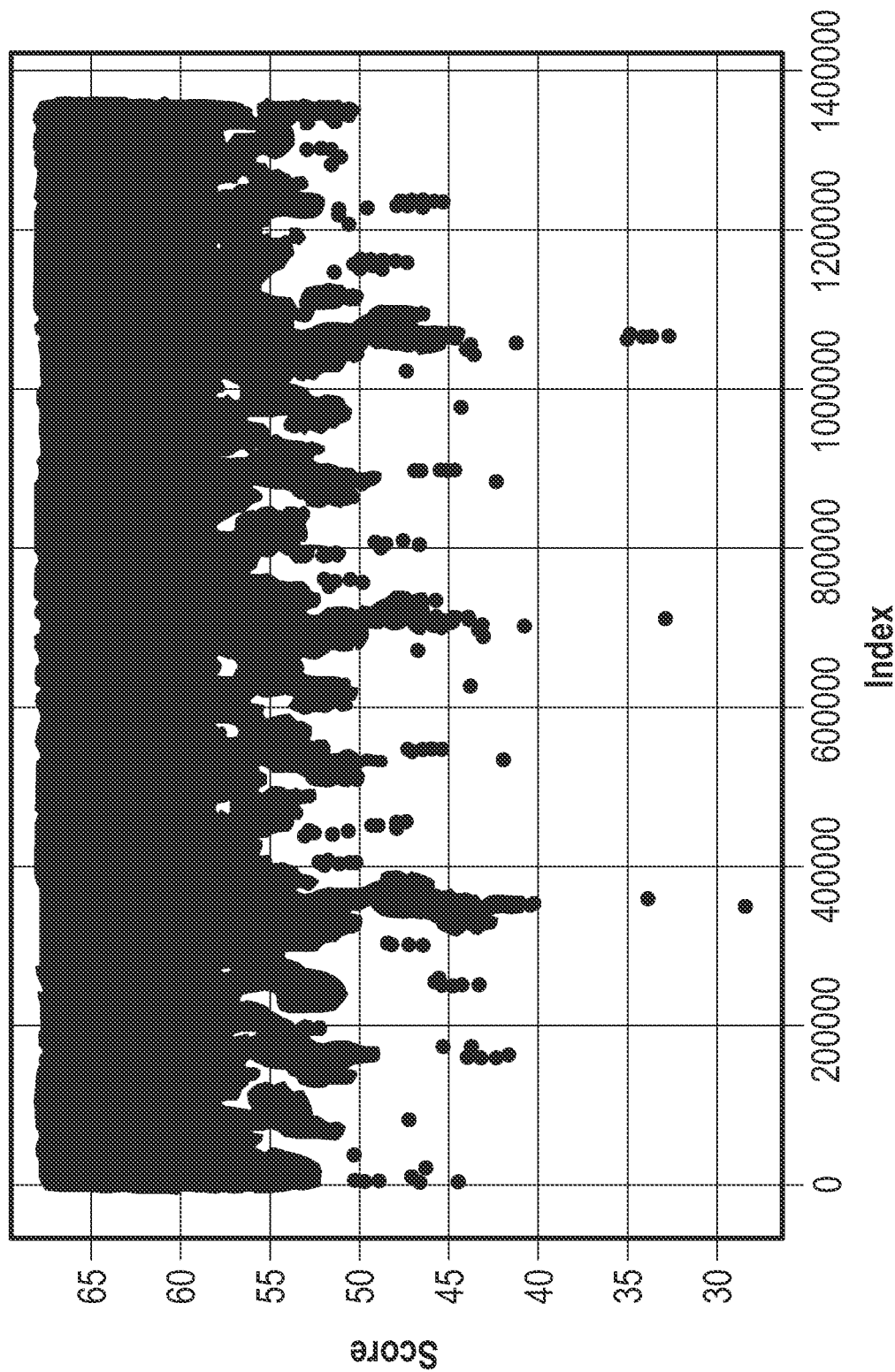
FIG. 17 shows standard deviation-based scoring comparing combination scoring v. combination indexing as may be encountered according to some embodiments.

FIG. 17 plots the combination score of all 12-12 branch combinations when the signal generating microinverter is in position H. Table II of FIG. 20 lists the scoring of all possible combinations. Row 12 shows that the algorithm found the correct combination of MIs [2, 3, 9, 11, 12, 13, 15, 16, 17, 19, 22, 23] for one branch and the second branch consists of the MIs not listed on row 12. In fact, it is the lowest score of all combinations ranging from 1-23 to 12-12.

Figure 18:
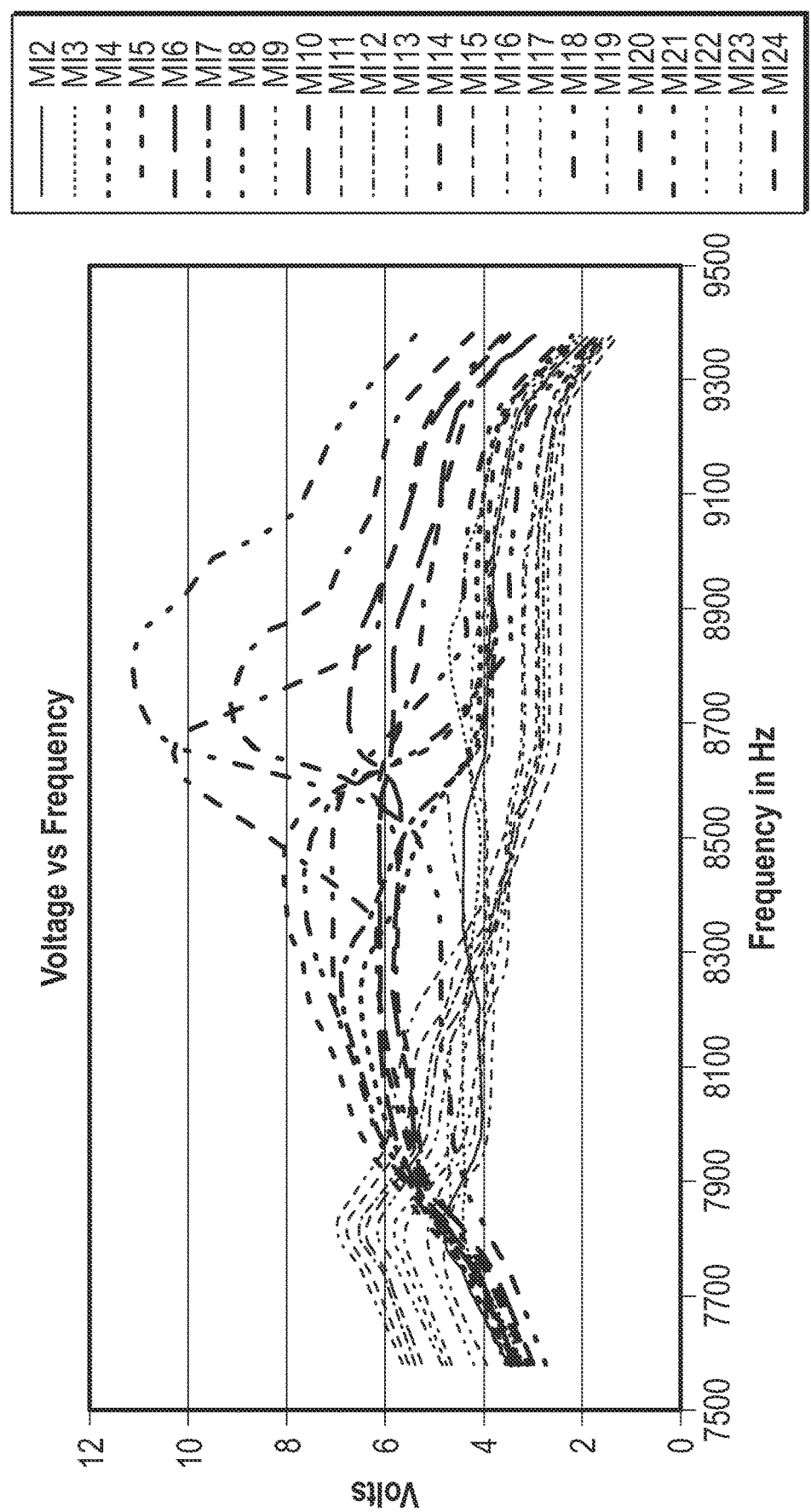
FIG. 18 shows a constructed frequency sweep, with the signal generator in position L, of FIG. 3 according to some embodiments.

The signal generator microinverter may be located in positions other than H of FIG. 3. However, additional mapping complexity may result. For example, it is more difficult to identify the branch members when the source MI (MI1) is chosen to be in position L as shown in FIG. 11. In that case, visual inspection of the frequency response data (FIG. 18) reveals there is no clear break between the two branches as the dashed and solid lines have some overlap in FIG. 18, which shows a constructed frequency sweep with the signal generator in position L of FIG. 3. Consequently, the location of the signal generator can impact the number of iterations required to obtain a clear discrepancy between groupings for purposes of mapping the devices. Absent a clear break, a different signal generator may need to be selected such that a larger discrepancy exists between the branches being tested. If the number of branches is unknown, several different signal generators may need to be selected until a clear demarcation is identified by the forward and backward sweeping minimums.

Figure 19:
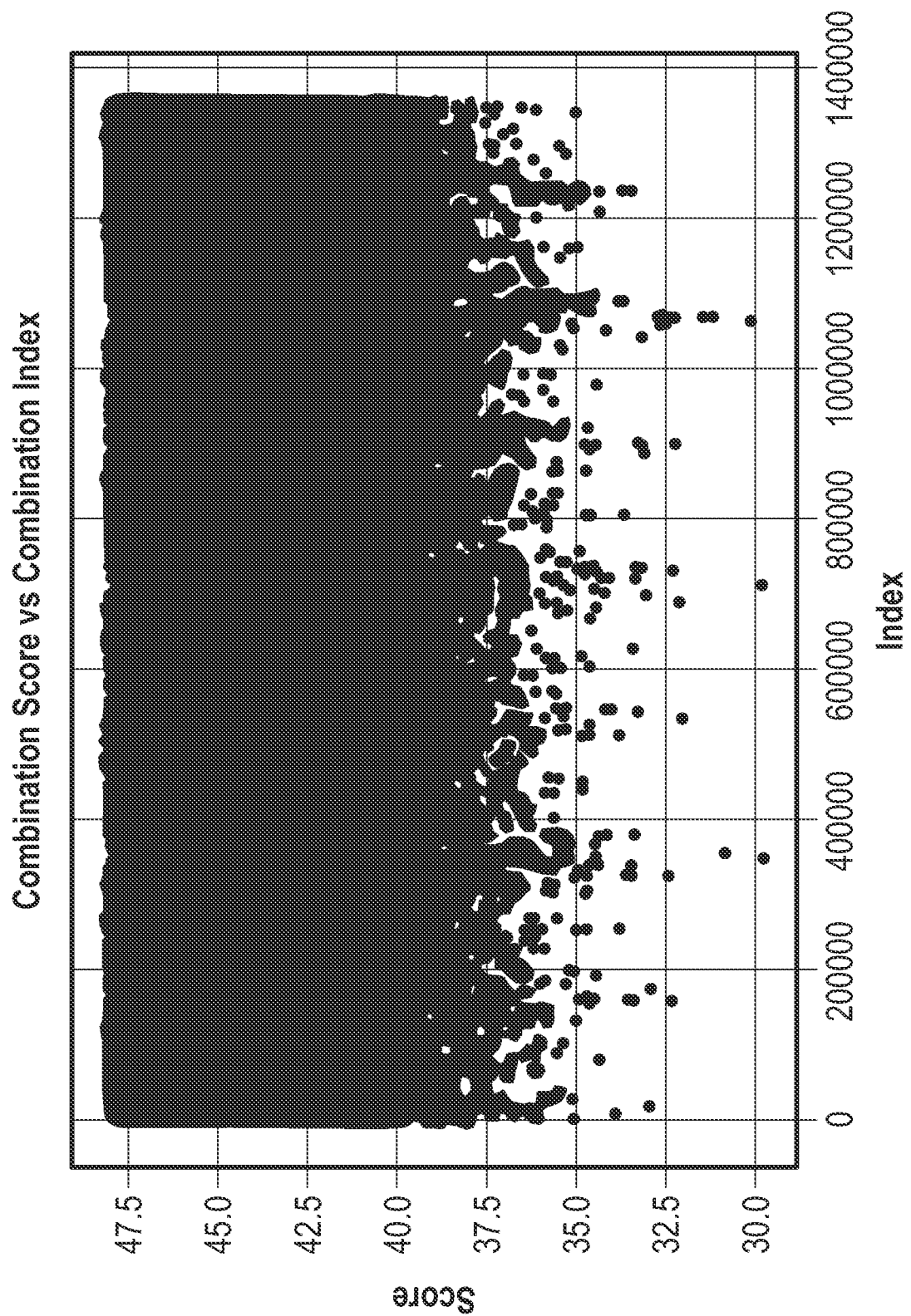
FIG. 19 shows standard deviation-based scoring comparing combination scoring v. combination indexing as may be encountered according to some embodiments.

Other techniques, such as a two-step approach may be used when a clear demarcation is not identified by the forward and reverse sweep minimums discussed above. For example, the standard deviation scheme may be applied to score possible combinations and can result in scores that are clustered closer in magnitude (comparing FIG. 17 to FIG. 19). FIG. 19 shows a standard deviation-based score for where signal generation source is in position L of FIG. 3. Table III of FIG. 20 shows that for this set of data, the lowest scored combination is not found in the 12th row as it was in Table II of FIG. 20. Therefore, to correctly identify the branches, a standard-deviation based algorithm may need to be applied to determine that the 12th row is the correct combination. A data normalization scheme may be applied to assist in this instance as well. Data normalization may also be used in other instances too.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein.

Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for mapping an array of photovoltaic (PV) modules comprising:
   a plurality of PV modules arranged in an array, each of the PV modules spaced apart from each other, each of the PV modules including a microinverter;
   a frequency generator, the frequency generator configured to generate a cycling frequency signal different from a base operating frequency, the cycling frequency generator configured to send the frequency signal to each of the PV modules in the plurality of PV modules;
   a plurality of sensors, each of the plurality of sensors configured to measure, a voltage or current at each of the PV modules, the voltage or current reflecting the cycling frequency signal sent by the frequency generator and received at the PV module of the plurality of PV modules being measured by the sensor; and
   a system analyzer configured to consider a plurality of the voltages or currents measured by the plurality of sensors and attributable to different PV modules of the plurality of PV modules and determine a relative position of the PV module with respect to other PV modules of the plurality of PV modules.

2. The system of claim 1 wherein during a mapping cycle, the frequency generator generates frequency signals transmitted over the system in an ascending frequency order and a descending frequency order.

3. The system of claim 1 wherein the system analyzer considers responses to the frequency signals from each of the PV modules of the plurality and assigns each PV module of the plurality to a branch circuit.

4. The system of claim 1 wherein the system analyzer accesses the PV modules through a circuit breaker.

5. The system of claim 1 wherein the frequency generator is located in one of the PV modules.

6. The system of claim 1 wherein the frequency generator is not located in one of the PV modules.

7. The system of claim 1 wherein the base operating frequency is 60 Hz of alternating voltages and wherein the frequency generator is further configured to generate the cycling frequency signal when the system is not connected to a mains power grid.

8. The system of claim 1 wherein at least one of the PV modules is configured to serve as the frequency generator, and is further configured to send a signal at the frequency generated, to each of the other PV modules in the plurality.

9. A process for mapping an array of installed microinverters comprising:
   when disconnected from a mains power grid, generating a plurality of test signals at a plurality of test frequencies and sending the plurality of test signals into an array of microinverters to be tested;
   for each test frequency of the plurality of test frequencies, within a bracketed amount of time, at each of the microinverters in the plurality of test frequencies being tested, sensing a voltage or a current generated from that microinverter's receipt of each of the plurality of test signals sent to that microinverter; and
   reviewing the sensed value for each of the microinverters being tested and determining whether the tested microinverters are in the same array.

10. The process of claim 9 further comprising:
    determining the relative position of each of the microinverters in the same array relative to each other, and
    wherein determining includes identifying voltage minimums for each microinverter at each test frequency, grouping the microinverters by the identified voltage minimums, and ordering microinverters of the same array by identified voltage minimums.

11. The process of claim 9 wherein the bracketed amount of time is 100 milliseconds or less.

12. The process of claim 9 wherein the test signal is generated by one of the microinverters.

13. The process of claim 9 wherein the test signal is a square wave and is generated by one of the microinverters using a power train of the microinverter.

14. The process of claim 9 wherein the test signal is generated by a photovoltaic system controller, the system controller remote from the array of microinverters and otherwise serving to monitor performance of the array of microinverters.

15. A device for remote mapping of installed photovoltaic (PV) modules comprising:
    a system controller for a plurality of photovoltaic (PV) modules, the PV modules located apart from the system controller,
    wherein the system controller is configured to send a plurality of ascending and descending cycling test signal to each of the PV modules when the PV modules are not generating AC for a mains grid, the ascending test signals having frequencies increasing in step, and the descending test signals having frequencies descending in step,
    wherein the system controller is further configured to evaluate a sensed voltage or current associated with each of the PV modules, the sensed voltage or current generated at the particular PV module and reflective of the cycling test signal sent by the system controller, and
    wherein the system controller is configured to determine which of the PV modules lie along a shared branch circuit.

16. The device of claim 15 wherein the system controller is further configured to use standard deviation analysis to determine the relative position of each PV module on the shared branch circuit.

17. The device of claim 15 further comprising:
    a gateway, the gateway configured to communicate evaluation results and for receipt of testing instructions to be performed with regard to the PV modules.

18. The device of claim 15 wherein the cycling test signal is a square wave.

19. The device of claim 15 wherein the evaluation includes adjusting for impedances of branch circuits and drop lines between the system controller and the PV modules being evaluated.

20. The device of claim 15 wherein the system controller is further configured to decouple the PV modules from a mains power grid before sending the cycling test signal.

* * * * *